(12) United States Patent
Tanaka et al.

(10) Patent No.: US 11,036,024 B2
(45) Date of Patent: Jun. 15, 2021

(54) METHOD FOR MANUFACTURING INTERMITTENT BONDING TYPE OPTICAL FIBER RIBBON AND INTERMITTENT BONDING TYPE OPTICAL FIBER RIBBON

(71) Applicant: Furukawa Electric Co., Ltd., Tokyo (JP)

(72) Inventors: Hiroki Tanaka, Tokyo (JP); Kenji Yokomizo, Tokyo (JP); Tomohiro Ishimura, Tokyo (JP); Yutaka Hoshino, Tokyo (JP); Masaki Iwama, Tokyo (JP); Eisuke Otani, Tokyo (JP); Shunichi Matsushita, Tokyo (JP); Yoshihiro Arashitani, Tokyo (JP); Takeshi Yagi, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/428,739

(22) Filed: May 31, 2019

(65) Prior Publication Data
US 2019/0285823 A1  Sep. 19, 2019

Related U.S. Application Data

(63) Continuation of application No. PCT/JP2017/045432, filed on Dec. 19, 2017.

(30) Foreign Application Priority Data

Dec. 20, 2016  (JP) .............................. JP2016-246995

(51) Int. Cl.
*G02B 6/44* (2006.01)
*G02B 6/00* (2006.01)

(52) U.S. Cl.
CPC ............. *G02B 6/4482* (2013.01); *G02B 6/44* (2013.01); *G02B 6/448* (2013.01)

(58) Field of Classification Search
CPC ...... G02B 6/4482; G02B 6/44; G02B 6/4448; G02B 6/00
(Continued)

(56) References Cited

U.S. PATENT DOCUMENTS 4,751,613 A * 6/1988 Werdin ................ H05K 1/0218
361/799
4,980,007 A * 12/1990 Ferguson ............... G02B 6/448
156/178
(Continued)

FOREIGN PATENT DOCUMENTS

CN  101325099 A  12/2008
CN  103858041 A  6/2014
(Continued)

OTHER PUBLICATIONS

Chinese Office Action dated Mar. 4, 2020, issued in Chinese Application No. 201780064491.8, total 13 pages with English translation.
(Continued)

*Primary Examiner* — Kaveh C Kianni
(74) *Attorney, Agent, or Firm* — Masuvalley & Partners

(57) ABSTRACT

A method for manufacturing an intermittent bonding type optical fiber ribbon which is capable of forming non-connection portions and intermittent connection portions between adjacent coated optical fibers formed into an optical fiber ribbon by performing a laser processing for the ribbon through irradiation with a pulse laser light, thereby making it possible to rapidly form the intermittent connection portions and the non-connection portions while maintaining high linear velocity of the coated optical fiber. The non-
(Continued)

(AFTER EMITTING PULSE LASER LIGHT)

connection portions and the intermittent connection portions are formed in the obtained intermittent bonding type optical fiber ribbon through the irradiation with the pulse laser light, so the intermittent bonding type optical fiber ribbon becomes the intermittent bonding type optical fiber ribbon, which is capable of securing operability during collective connection and surely being subjected to an intermediate branching without damaging cable characteristics during high density mounting.

9 Claims, 12 Drawing Sheets

(58) Field of Classification Search
USPC .......................................................... 385/128
See application file for complete search history.

(56) References Cited

U.S. PATENT DOCUMENTS

| | | | | |
|---|---|---|---|---|
| 5,076,881 A * | 12/1991 | Ferguson | ............... | G02B 6/448 156/179 |
| 5,379,363 A * | 1/1995 | Bonicel | ............... | G02B 6/4482 385/114 |
| 5,412,497 A * | 5/1995 | Kaetsu | ............... | G02B 6/4452 385/134 |
| 5,920,664 A * | 7/1999 | Hirabayashi | ............. | G02B 6/43 349/196 |
| 6,054,217 A * | 4/2000 | Szum | ............... | G02B 6/4403 428/392 |
| 6,305,848 B1 * | 10/2001 | Gregory | ............... | G02B 6/4246 385/134 |
| 6,392,241 B1 * | 5/2002 | Rushbrooke | ....... | G01N 21/6452 250/370.08 |
| 6,584,257 B1 * | 6/2003 | Hurley | ............... | G02B 6/4471 385/109 |
| 6,868,219 B2 * | 3/2005 | Lipski | ............... | G02B 6/4452 385/135 |
| 9,995,896 B2 * | 6/2018 | Namazue | ............ | G02B 6/4403 |
| 2001/0002943 A1 * | 6/2001 | Nagayama | ........ | C03B 37/02763 385/100 |
| 2001/0030855 A1 * | 10/2001 | Green | ............... | G02B 6/4272 361/754 |
| 2001/0048797 A1 * | 12/2001 | Van Dijk | ............. | G02B 6/4482 385/114 |
| 2002/0008463 A1 * | 1/2002 | Roach | ............... | G09F 9/305 313/492 |
| 2002/0028048 A1 * | 3/2002 | Dair | ............... | G02B 6/4257 385/92 |
| 2002/0030872 A1 * | 3/2002 | Dair | ............... | G02B 6/4214 398/135 |
| 2002/0033979 A1 * | 3/2002 | Dair | ............... | G02B 6/428 398/164 |
| 2002/0197032 A1 * | 12/2002 | Conrad | ............... | G02B 6/4482 385/114 |
| 2003/0016924 A1 * | 1/2003 | Thompson | ........... | G02B 6/4482 385/114 |
| 2003/0020986 A1 * | 1/2003 | Pang | ............... | G02B 6/4246 398/139 |
| 2003/0053786 A1 * | 3/2003 | Kato | ............... | G02B 6/43 385/134 |
| 2003/0174953 A1 * | 9/2003 | Carnevale | .............. | G02B 6/366 385/39 |
| 2003/0198454 A1 * | 10/2003 | Chiang | ............... | G02B 6/25 385/137 |
| 2004/0001678 A1 | 1/2004 | Chiasson et al. | | |
| 2004/0069997 A1 * | 4/2004 | Dair | ............... | G02B 6/4214 257/81 |
| 2005/0084200 A1 * | 4/2005 | Meis | ............... | G02B 6/3885 385/14 |
| 2005/0094945 A1 * | 5/2005 | Danley | ............... | B23K 26/16 385/78 |
| 2006/0045417 A1 * | 3/2006 | Morita | ............... | H04B 10/801 385/31 |
| 2006/0211294 A1 * | 9/2006 | Lipski | ............... | H04J 3/1611 439/488 |
| 2008/0314613 A1 | 12/2008 | Huang et al. | | |
| 2011/0110635 A1 * | 5/2011 | Toge | ............... | G02B 6/441 385/102 |
| 2012/0045166 A1 * | 2/2012 | Trotabas | ............... | G02B 6/4403 385/14 |
| 2013/0028563 A1 * | 1/2013 | Matsuzawa | .......... | G02B 6/4482 385/120 |
| 2013/0156390 A1 * | 6/2013 | Matsuzawa | .......... | G02B 6/4403 385/114 |
| 2013/0343712 A1 * | 12/2013 | Matsuzawa | .......... | G02B 6/4432 385/102 |
| 2014/0016905 A1 * | 1/2014 | Tanabe | ............... | G02B 6/4403 385/114 |
| 2014/0079354 A1 * | 3/2014 | Aoki | ............... | G02B 6/38 385/72 |
| 2014/0314382 A1 * | 10/2014 | Sato | ............... | G02B 6/4403 385/103 |
| 2015/0030296 A1 | 1/2015 | Sakabe et al. | | |
| 2015/0117821 A1 * | 4/2015 | Aoki | ............... | G02B 6/425 385/83 |
| 2015/0346445 A1 * | 12/2015 | Blazer | ............... | G02B 6/4433 385/114 |
| 2016/0091686 A1 * | 3/2016 | Erdman | ............... | G02B 6/4249 385/135 |
| 2017/0153402 A1 * | 6/2017 | Chiasson | ............. | G02B 6/4411 |
| 2017/0219790 A1 * | 8/2017 | Debban | ............... | B05D 1/02 |
| 2017/0219792 A1 * | 8/2017 | Debban | ............... | G02B 6/448 |
| 2017/0336566 A1 * | 11/2017 | Burek | ............... | G02B 6/25 |
| 2018/0039035 A1 * | 2/2018 | Chiasson | ............. | G02B 6/4403 |
| 2018/0149821 A1 * | 5/2018 | Bringuier | ............ | G02B 6/4403 |
| 2018/0273427 A1 * | 9/2018 | Tanaka | ............... | C03C 25/475 |
| 2019/0025156 A1 * | 1/2019 | Takahashi | ............ | G01N 21/892 |
| 2019/0154935 A1 * | 5/2019 | Scherwin | ............. | G02B 6/4471 |
| 2019/0204519 A1 * | 7/2019 | Sato | ............... | G02B 6/4405 |

FOREIGN PATENT DOCUMENTS

| | | | | |
|---|---|---|---|---|
| JP | H01-138516 A | 5/1989 | | |
| JP | 2001-264604 A | 9/2001 | | |
| JP | 2008-505360 A | 2/2008 | | |
| JP | 2008-311120 A | 12/2008 | | |
| JP | 2010-033010 A | 2/2010 | | |
| JP | 2012-252196 A | 12/2012 | | |
| JP | 2012-252815 A | 12/2012 | | |
| JP | 5117519 B | 1/2013 | | |
| JP | 2016099458 A * | 5/2016 | .......... | G02B 6/4482 |
| JP | 2016-142948 A | 8/2016 | | |
| JP | 2018-010239 A | 1/2018 | | |

OTHER PUBLICATIONS

International Search Authority/JPO, International Search Report dated Mar. 3, 2018 in International Patent Application No. PCT/JP2017/045432, 4 pages.
The Extended European Search Report dated Jun. 19, 2020 in European Application No. 17882406.6, 7pages.

* cited by examiner

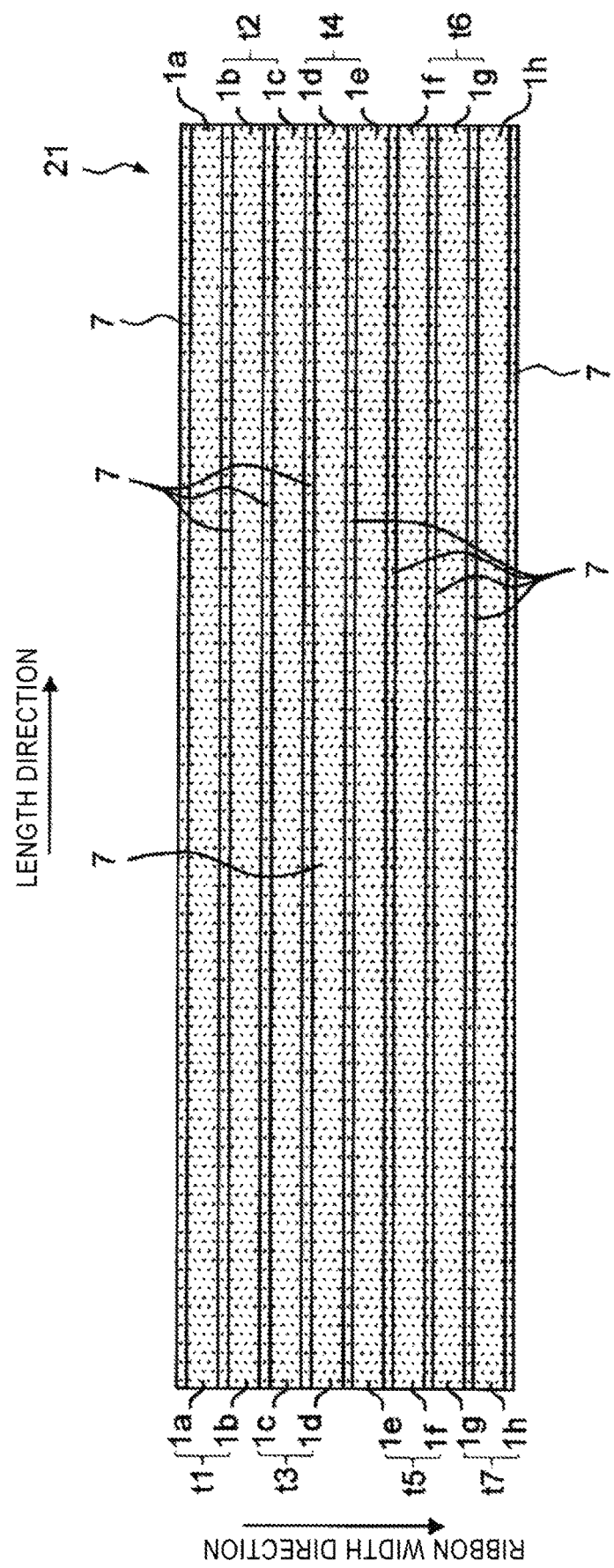

(BEFORE EMITTING PULSE LASER LIGHT)

(AFTER EMITTING PULSE LASER LIGHT)

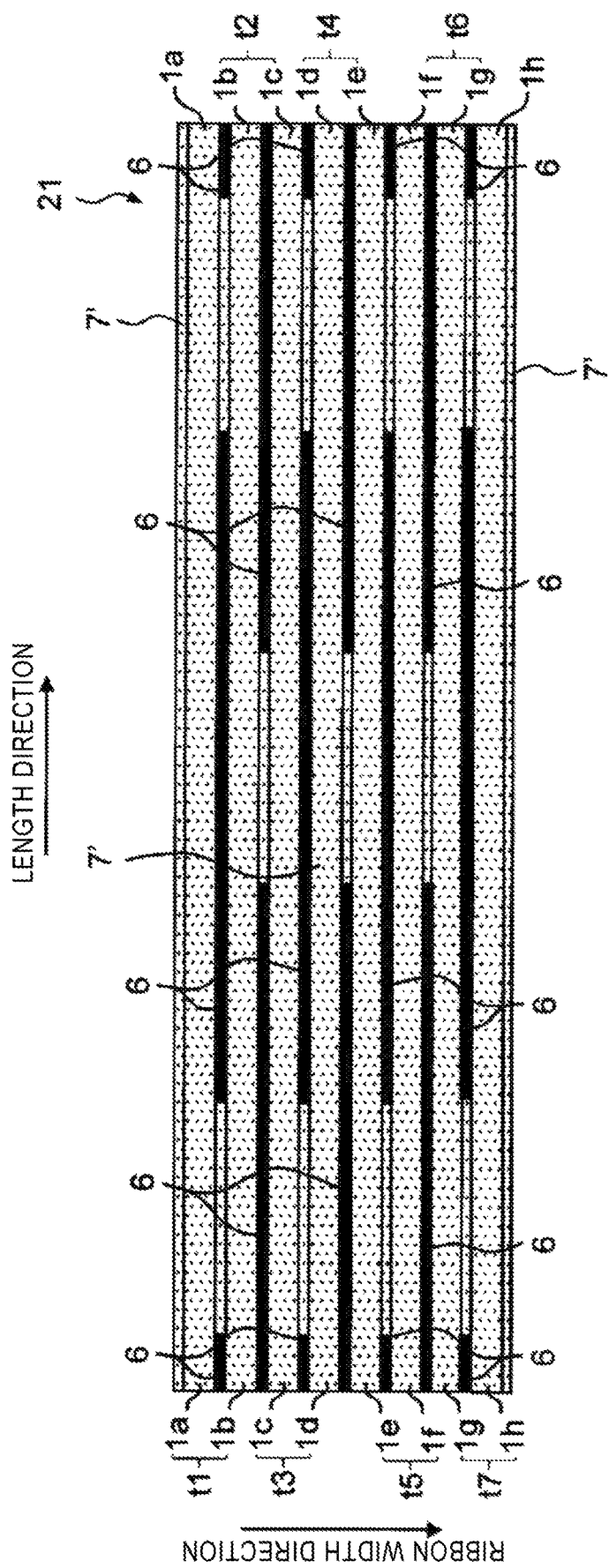

(BEFORE EMITTING PULSE LASER LIGHT)

(AFTER EMITTING PULSE LASER LIGHT)

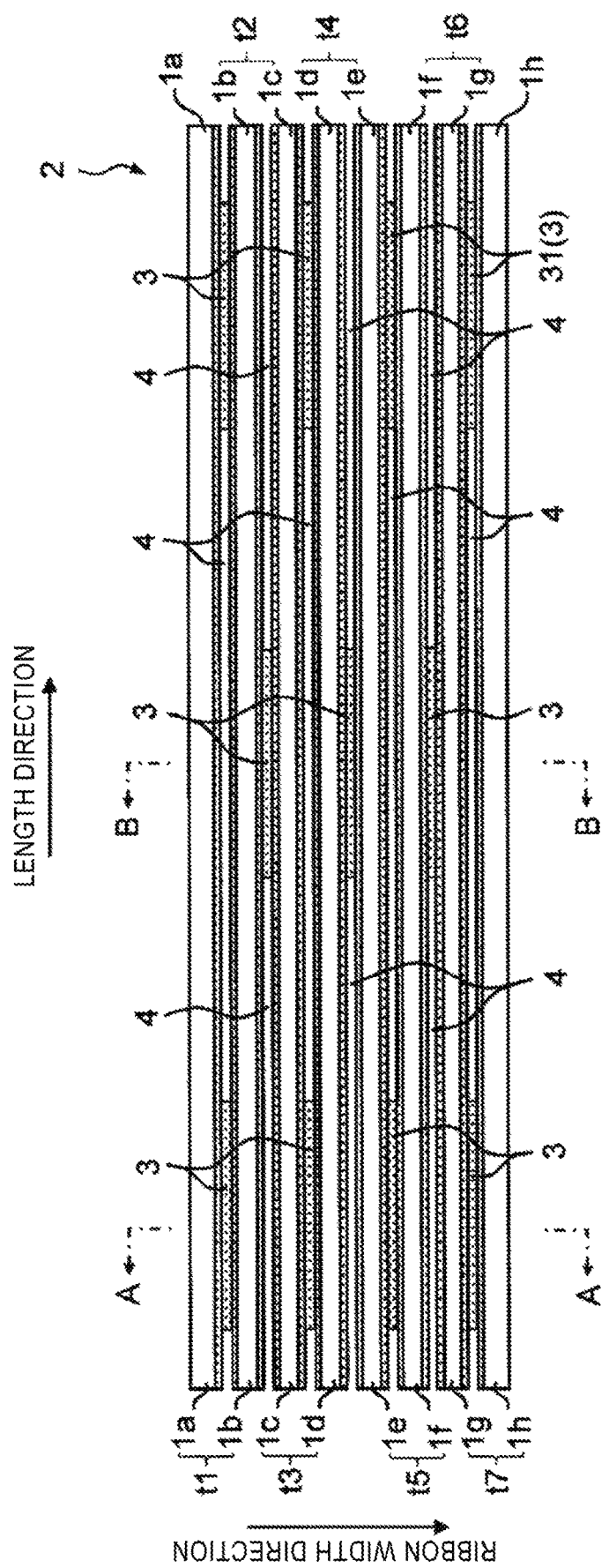

(BEFORE EMITTING PULSE LASER LIGHT)

(AFTER EMITTING PULSE LASER LIGHT)

METHOD FOR MANUFACTURING INTERMITTENT BONDING TYPE OPTICAL FIBER RIBBON AND INTERMITTENT BONDING TYPE OPTICAL FIBER RIBBON

RELATED APPLICATIONS

This application claims priority under 35 U.S.C. § 111(a) as a Continuation application of PCT Application No. PCT/JP2017/045432, filed Dec. 19, 2017, entitled "METHOD FOR MANUFACTURING OPTICAL FIBER INTERMITTENT TAPE CORE AND OPTICAL FIBER INTERMITTENT TAPE CORE", which claims benefit of Japanese Patent Application No. JP2016-246995, filed Dec. 20, 2016, both of which are incorporated herein by reference in their entireties.

TECHNICAL FIELD

The present invention relates to a method for manufacturing an intermittent bonding type optical fiber ribbon, and the intermittent bonding type optical fiber ribbon. More particularly, the present invention relates to a method for manufacturing an intermittent bonding type optical fiber ribbon formed by intermittently bonding adjacent coated optical fibers to each other in a length direction by intermittent connection portions, and the intermittent bonding type optical fiber ribbon.

BACKGROUND ART

In recent years, there has been an increasing demand for short-range high-speed optical communication for connecting a large-scale data center which provides various Internet services and accordingly, a high-speed large-scale communication service for directly leading an optical fiber into a house has been rapidly expanded. A plurality of optical fiber ribbons (hereinafter, also referred to as "ribbon") are bundled and accommodated in an optical fiber cable used for relevant services. In order to draw an optical fiber from the optical fiber cable out and lead the optical fiber into a house of a user, it is necessary to perform an intermediate branching of the optical fiber cable, taking out a desired ribbon, and separating and taking out a single coated optical fiber from the ribbon.

Therefore, various types of optical fiber ribbons (for example, see Patent Literature 1; JP 5117519 B2) have been suggested to reduce a diameter of an optical fiber cable and increase a density of the optical fiber cable while enabling easy separation of a single coated optical fiber. Here, the optical fiber ribbon is formed by arranging a plurality of coated optical fibers obtained by coating optical fibers with a resin composition or the like for protection in a planar form and integrally connecting the coated optical fibers by using connection portions formed of a resin composition or the like.

Currently, an optical fiber ribbon constituted by four fibers, eight fibers, twelve fibers, twenty-four fibers, or the like has been used. The optical fiber ribbon is a distributed optical fiber and can have a compact configuration. Further, in a case of an optical fiber cable, it is possible to reduce a diameter of the cable and increase a density of the cable. For example, in Patent Literature 1; JP 5117519 B2, adjacent coated optical fibers are intermittently connected to each other in a length direction (longitudinal direction) and connection portions adjacent to each other in a ribbon width direction are alternately arranged so as not to overlap each other. As described above, adjacent coated optical fibers are intermittently connected to each other in a length direction to form a ribbon, thereby facilitating deformation when a plurality of ribbons is bundled. As a result, it is possible to reduce a diameter of an optical fiber cable and increase a density of the optical fiber cable. In addition, since the ribbon has non-connection portions (single fiber portions), it is possible to separate the ribbon into single coated optical fibers relatively easily without using a dedicated tool.

Here, means (for example, see Patent Literature 2; JP 2001-264604 A) having a dispenser which discharges an adhesive to bond coated optical fibers to each other, means of using a shutter mechanism (for example, see Patent Literature 3; JP 2010-33010 A), means of using an application method of using a transfer from a rotor (for example, see Patent Literature 4; JP 2012-252196 A), or the like is provided as means for applying a bonding member for intermittently adhering coated optical fibers to each other. Alternatively, a method of partially curing an applied resin to obtain an intermittent adhering portion or the like is provided.

SUMMARY OF INVENTION

As described above, as a method for manufacturing an intermittent bonding type optical fiber ribbon in which coated optical fibers are intermittently bonded to each other at arbitrary intervals, a bonding member is intermittently applied to arbitrary places of adjacent coated optical fibers while aligning a plurality of coated optical fibers in parallel to one another. In this method, however, a speed of application of the bonding member is an important factor in determining a manufacturing speed. Therefore, it is difficult to increase linear velocity of a coated optical fiber to improve manufacturability.

For example, in the method as described in Patent Literature 2, a bonding member is discharged onto a primary coated fiber when a pressure is applied. However, there is a limitation on an operation of applying a pressure or stopping applying a pressure by a dispenser. When linear velocity is increased, the operation of the dispenser cannot follow up. Similarly, also in a case of using a shutter mechanism described in Patent Literature 3, linear velocity is limited by an operation speed of a shutter. In a case of using transfer means from a rotor as described in Patent Literature 4, a bonding member attached on a surface of the rotor is scattered by a centrifugal force caused by rotation, such that an amount of attachment to a coated optical fiber is non-uniform. In addition, such an influence becomes more conspicuous in a case of high-speed manufacturing.

The present invention has been made in view of the above problems, and an object of the present invention is to provide a method for manufacturing an intermittent bonding type optical fiber ribbon, which can also be used for manufacturing with high linear velocity, and the intermittent bonding type optical fiber ribbon.

In order to solve the problems described above, a method for manufacturing an intermittent bonding type optical fiber ribbon according to a first aspect of the present invention is a method for manufacturing an intermittent bonding type optical fiber ribbon in which a plurality of coated optical fibers are arranged in parallel to each other and intermittent connection portions intermittently connecting adjacent coated optical fibers to each other in a length direction are formed, and the method includes: a step of forming the coated optical fibers into a ribbon; and a step of forming the intermittent connection portions by irradiating, with pulse laser light, a portion between the adjacent coated optical fibers to intermittently form non-connection portions at which the adjacent coated optical fibers are not connected to each other in the length direction.

In the method for manufacturing an intermittent bonding type optical fiber ribbon according to the first aspect of the present invention, the step of forming the coated optical fibers into a ribbon is a step of forming the coated optical fibers into a ribbon by a resin composition containing a laser light absorbing component which absorbs a laser wavelength.

A method for manufacturing an intermittent bonding type optical fiber ribbon according to a second aspect of the present invention is a method for manufacturing an intermittent bonding type optical fiber ribbon in which a plurality of coated optical fibers are arranged in parallel to each other and intermittent connection portions intermittently connecting adjacent coated optical fibers to each other in a length direction are formed, and the method includes: a step of forming the coated optical fibers into a ribbon; a step of forming a laser light absorbing portion, in which a resin composition containing a laser light absorbing component which absorbs a laser wavelength is present, between at least the adjacent coated optical fibers; and a step of forming the intermittent connection portions by irradiating, with pulse laser light, the laser light absorbing portion to intermittently form non-connection portions at which the adjacent coated optical fibers are not connected to each other in the length direction.

In the method for manufacturing an intermittent bonding type optical fiber ribbon according to the second aspect of the present invention, laser light absorbing portions are intermittently formed in the length direction of the coated optical fiber.

In the method for manufacturing an intermittent bonding type optical fiber ribbon according to the second aspect of the present invention, the laser light absorbing portion is formed by applying the resin composition containing the laser light absorbing component which absorbs the laser wavelength.

In the method for manufacturing an intermittent bonding type optical fiber ribbon according to the present aspect of the present invention, a content of the laser light absorbing component which absorbs the laser wavelength is 0.3 to 5.0 mass % based on the entire resin composition containing the laser light absorbing component.

In the method for manufacturing an intermittent bonding type optical fiber ribbon according to the present aspect of the present invention, a wavelength of the pulse laser light is 500 to 2000 nm.

An intermittent bonding type optical fiber ribbon according to the present invention is manufactured by the method for manufacturing an intermittent bonding type optical fiber ribbon described above and the non-connection portions are intermittently formed by irradiation with the pulse laser light.

According to the method for manufacturing an intermittent bonding type optical fiber ribbon of the present invention, it is possible to conveniently form the non-connection portions and the intermittent connection portions between adjacent coated optical fibers which are formed into a ribbon by performing a laser processing of emitting pulse laser light on an optical fiber ribbon in which coated optical fibers are not bonded to each other. As a result, a method for manufacturing an intermittent bonding type optical fiber ribbon, which can form the intermittent connection portions and the non-connection portions at a high speed while maintaining linear velocity of a coated optical fiber or a high speed of application of the resin composition applied to connect adjacent coated optical fibers to each other, is provided.

In addition, the obtained intermittent bonding type optical fiber ribbon has the non-connection portions and the intermittent connection portions formed by pulse laser light irradiation, such that it is possible to surely perform an intermediate branching and secure workability at the time of collective connection without damaging cable characteristics during high density mounting.

BRIEF DESCRIPTION OF DRAWINGS

FIG. 6 is a front view illustrating an aspect of an optical fiber ribbon obtained by a ribbon forming step according to a first embodiment.

FIG. 8 is a front view illustrating an aspect of an optical fiber ribbon obtained by a step of forming laser light absorbing portions according to a second embodiment.

FIG. 10 is a front view of an optical fiber ribbon manufactured by a manufacturing method according to a modified aspect of the first embodiment.

DESCRIPTION OF EMBODIMENTS

Hereinafter, an aspect of the present invention will be described.

Figure 1:
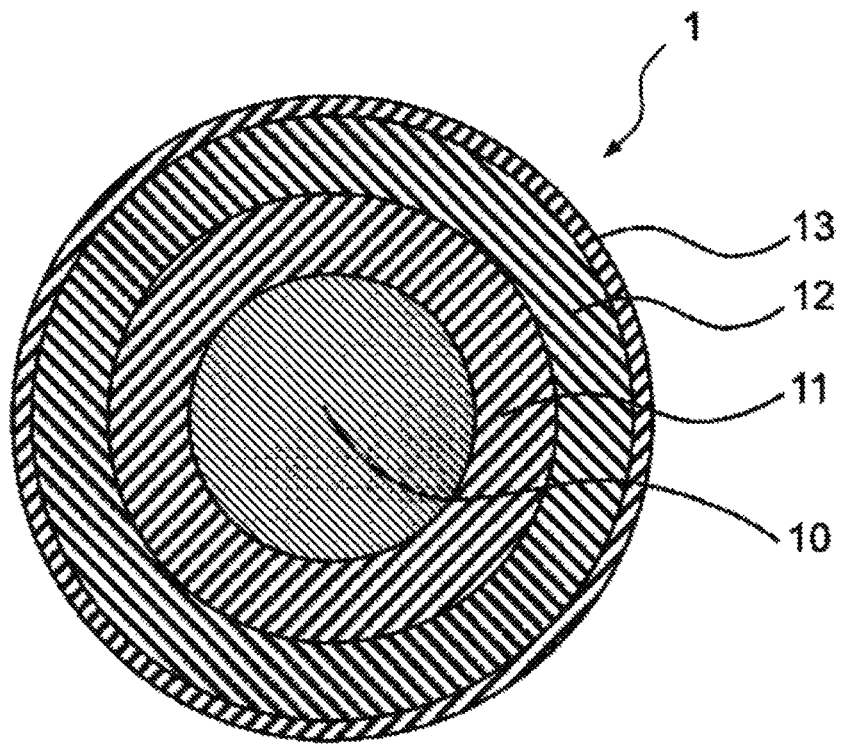
FIG. 1 is a cross-sectional view illustrating an example of a structure of a coated optical fiber.
Figure 2:
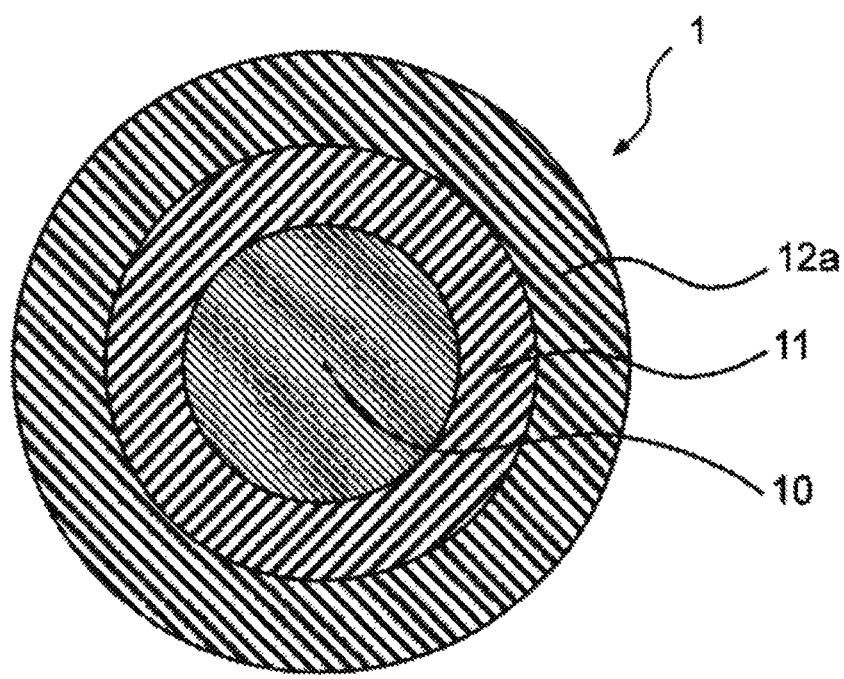
FIG. 2 is a cross-sectional view illustrating another example of the structure of the coated optical fiber.

(I) Configuration of Coated Optical Fiber 1 and Manufacturing Thereof:

First, a colored and coated optical fiber 1 will be described as an aspect of a coated optical fiber 1, which constitutes an intermittent bonding type optical fiber ribbon 2, by way of example. FIG. 1 is a cross-sectional view illustrating an example of a structure of the coated optical fiber 1. FIG. 2 is a cross-sectional view illustrating another example of the structure of the coated optical fiber 1. In FIGS. 1 and 2, 1 indicates the coated optical fiber (colored and coated optical fiber), 10 indicates an optical fiber, 11 indicates a primary coating layer, 12 indicates a secondary coating layer, 12a indicates a colored secondary coating layer (only in FIG. 2), and 13 indicates a colored layer (only in FIG. 1).

In a configuration illustrated in FIG. 1, the primary coating layer (primary layer) 11, the secondary coating layer (secondary layer) 12, and the colored layer 13 are formed in this order to constitute the coated optical fiber 1, the primary coating layer 11 being formed around the optical fiber 10 such as a glass optical fiber or the like, the secondary coating layer 12 being formed around the primary coating layer 11, and the colored layer 13 being formed around the secondary coating layer 12. In addition, the colored layer 13 is the outermost layer of the coated optical fiber 1.

Meanwhile, in a configuration illustrated in FIG. 2, the primary coating layer 11 and the colored secondary coating layer 12a are sequentially formed to form the coated optical fiber 1, the primary coating layer 11 being formed around the optical fiber 10 and the colored secondary coating layer 12a being formed around the primary coating layer 11. In addition, the colored secondary coating layer 12a is the outermost layer of the coated optical fiber 1. It should be noted that the colored layer 13 and the colored secondary coating layer 12a, each of which is the outermost layer of the coated optical fiber 1, are collectively referred to as the colored layer 13 or the like in some cases in the following description.

In general, preferable outer diameters of respective layers of the coated optical fiber 1 are as follows. An outer diameter of the optical fiber 10 is within a range from 80 µm to 125 µm, an outer diameter of the primary coating layer 11 is within a range from 120 µm to 200 µm, an outer diameter of the secondary coating layer 12 is within a range from 160 µm to 242 µm, and an outer diameter of the colored layer 13 is within a range from 173 µm to 255 µm. In addition, in the configuration in which the secondary coating layer 12 doubles as the colored layer 13 as illustrated in FIG. 2, it is preferable that the colored secondary coating layer 12a has an outer diameter within a range from 160 µm to 255 µm.

As resin material, which is a material for forming the primary coating layer (primary layer) 11 and the secondary coating layer (secondary layer) 12 of the coated optical fiber 1, or a material for forming the colored layer 13 of the coated optical fiber 1, a resin composition known in the art and an additive-mixed composition thereof can be used. For example, an ultraviolet-curing resin composition containing a resin such as an ultraviolet-curing resin or the like can be used. In detail, for example, it is possible to preferably use a resin composition containing a necessary component among various additives such as an oligomer, a diluent monomer, a polyol, a photoinitiator, a silane coupling agent, a sensitizer, a pigment (and a coloring material in which a pigment and a resin or the like are mixed), a lubricant, and the like.

The manufacturing of the coated optical fiber 1 will be described with the glass optical fiber 10 as the optical fiber and the ultraviolet-curing resin composition as the resin composition as an example. First, for example, a preform (base material) having quartz glass as a main component is heated and melted by a draw furnace to form a quartz glass optical fiber (glass optical fiber 10). Next, a component (ultraviolet-curing resin composition) containing a liquid resin is applied to the glass optical fiber 10 by using a coating die, and then ultraviolet rays are emitted to the applied ultraviolet-curing resin by an ultraviolet ray irradiation device (UV irradiation device) to cure the component.

By doing so, the glass optical fiber 10 is coated with the primary coating layer 11 and the secondary coating layer 12, and then an outer circumference of the secondary coating layer 12 is coated with the colored layer 13 as a next process, thereby manufacturing the coated optical fiber 1. It should be noted that the coated optical fiber 1 including the colored secondary coating layer 12a as the outermost layer thereof may also be manufactured by coloring the secondary coating layer 12 as described above.

(II) Configuration of Optical Fiber Ribbon and Manufacturing Thereof (First Embodiment):

The intermittent bonding type optical fiber ribbon 2, which is manufactured according to the present invention, is manufactured by arranging a plurality of coated optical fibers 1 obtained by the method described above or the like in parallel to one another and forming intermittent connection portions 3 intermittently connecting adjacent coated optical fibers 1 to each other in a length direction and non-connection portions 4 at which adjacent coated optical fibers are intermittently not connected to each other in the length direction.

In the present embodiment, the intermittent bonding type optical fiber ribbon 2 is manufactured by a step (ribbon forming step) of arranging the plurality of coated optical fibers 1 in parallel to each other to form a ribbon by using a resin composition containing a laser light absorbing component which absorbs a laser wavelength, and a step (a step of forming intermittent connection portions and non-connection portions) of irradiating a portion between adjacent coated optical fibers 1 with pulse laser light to intermittently form the non-connection portions 4 at which the adjacent coated optical fibers 1 are not connected to each other in the length direction to thereby form the intermittent connection portions 3.

Figure 3:
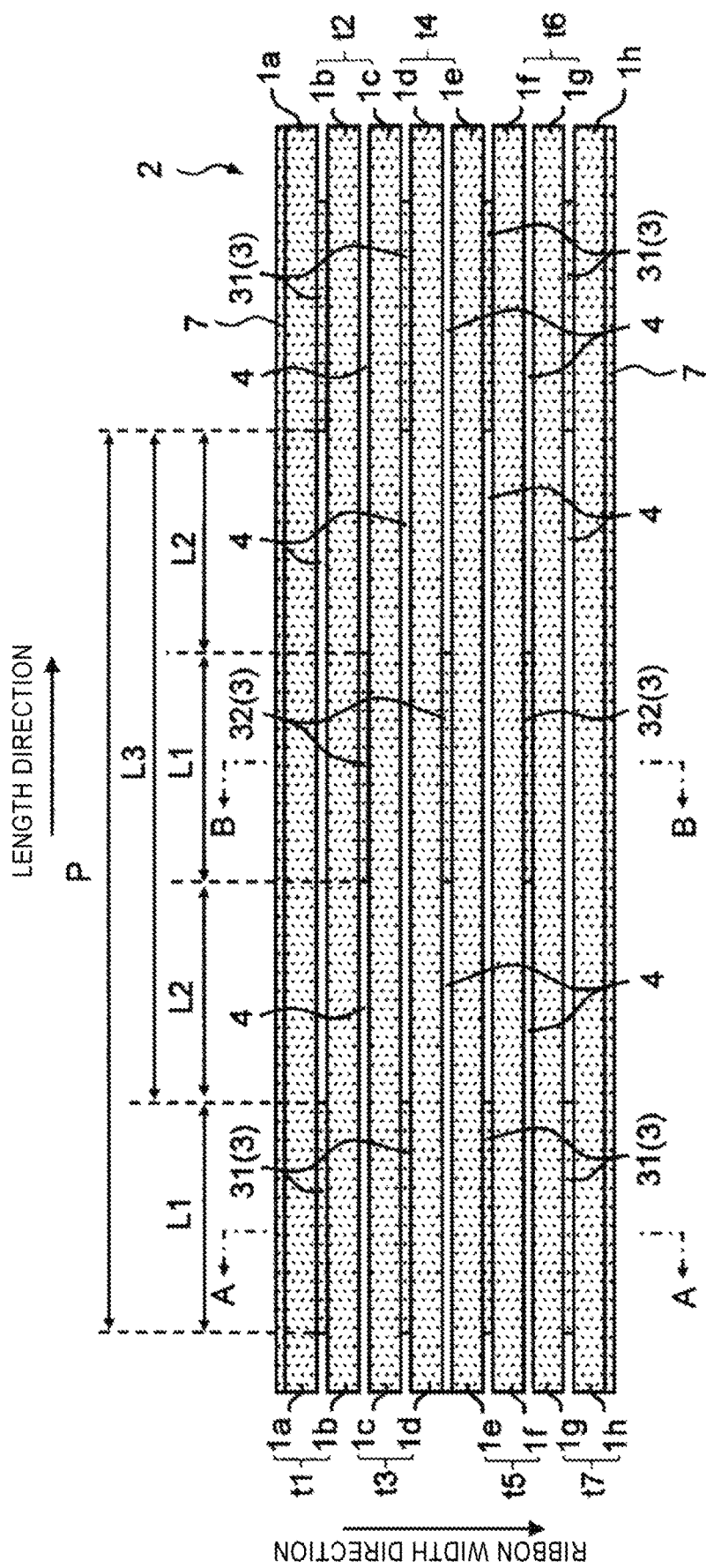
FIG. 3 is a front view illustrating an aspect of an intermittent bonding type optical fiber ribbon manufactured by a manufacturing method of the present invention.
Figure 4:
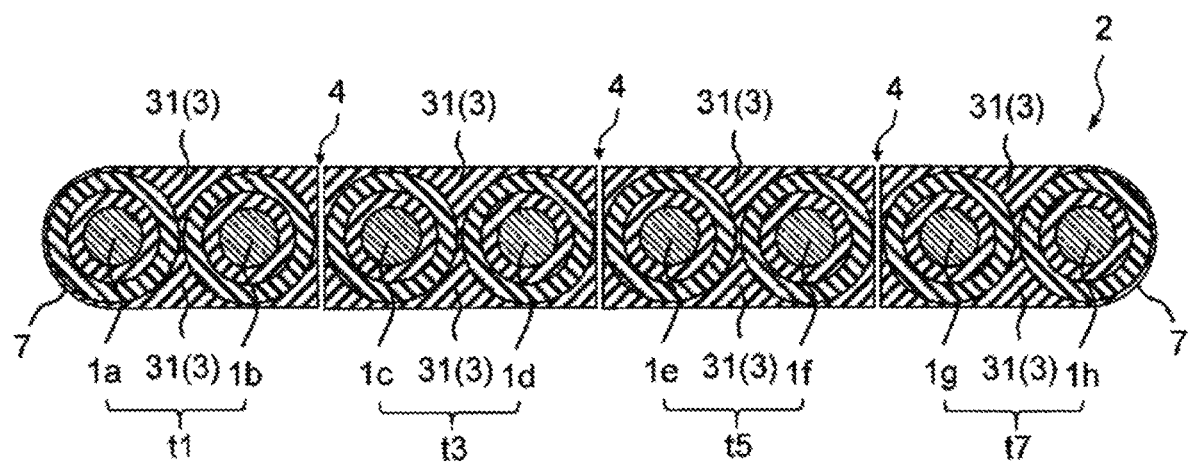
FIG. 4 is a cross-sectional view taken along line A-A in FIG. 3.
Figure 5:
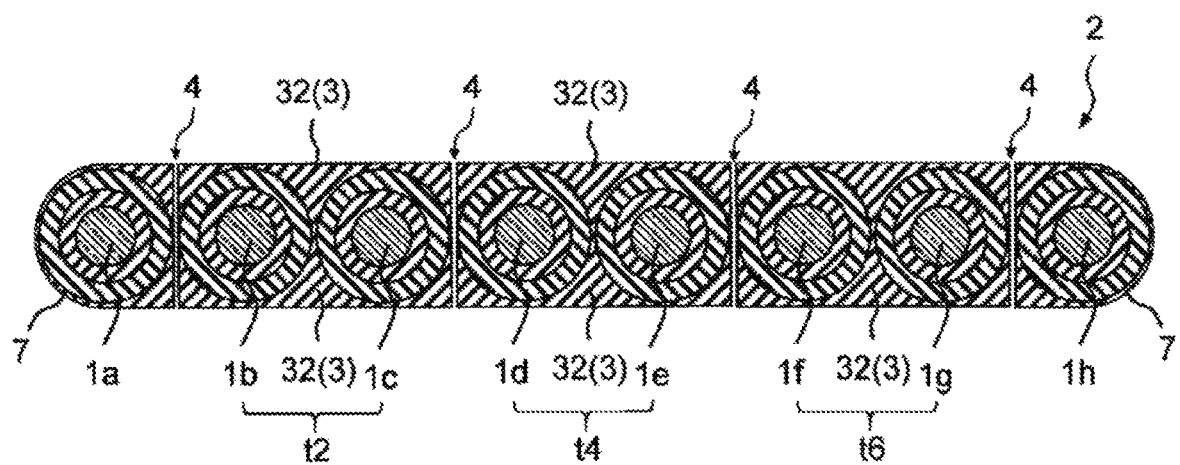
FIG. 5 is a cross-sectional view taken along line B-B in FIG. 3.

FIG. 3 is a front view (a view in which a surface of the ribbon is regarded as a front surface, the same applies to the following front view) illustrating an aspect of the intermittent bonding type optical fiber ribbon 2 manufactured by the manufacturing method of the present invention (that is common to the first embodiment and a second embodiment to be described below). In addition, FIG. 4 is a cross-sectional view taken along line A-A in FIG. 3, and FIG. 5 is a cross-sectional view taken along line B-B in FIG. 3. It should be noted that an intermittent bonding type optical fiber ribbon 2 constituted by eight coated optical fibers 1 is shown in FIGS. 3 to 5 for convenience, and a cross-sectional shape of the coated optical fiber 1 in FIG. 2 is illustrated as a cross-sectional shape in FIGS. 4 and 5 by way of example.

The intermittent bonding type optical fiber ribbon 2 is formed in a manner in which the coated optical fibers 1 arranged in parallel to each other are intermittently connected to each other in the length direction by forming a portion 7 collectively coated with a resin composition containing a laser light absorbing component (hereinafter, simply referred to as an "absorbing component") which absorbs a laser wavelength to be described below around the coated optical fibers 1 arranged in parallel to each other or between adjacent coated optical fibers 1, forming the intermittent connection portions (also called intermittent type connection portions) 3 present between the adjacent coated optical fibers 1, and forming the non-connection portions 4 by cutting a portion between the intermittent connection portions 3 (intermittent connection portions 31 and 32) in the length direction by a laser processing. The connection portions (intermittent connection portions 3) are intermittently disposed on the coated optical fibers 1, such that it is possible to integrally connect the coated optical fibers 1 to each other, improve unitization and a handleability of the coated optical fibers 1, and surely perform an intermediate branching. In addition, it is possible to simplify an installation work or reduce a time for the installation work.

According to a configuration illustrated in FIG. 3, in the intermittent bonding type optical fiber ribbon 2, the intermittent connection portions 31 and 32 and the non-connection portions 4 are formed between adjacent two (2) coated optical fibers 1 (coated optical fibers 1a to 1h) in the length direction so as to have predetermined lengths, respectively, and be alternately arranged, thereby intermittently connecting the adjacent coated optical fibers 1 by the intermittent connection portions 3 in the length direction (for example, see pairs of coated optical fibers t1 to t7 such as a pair of coated optical fibers t1 including a coated optical fiber 1a and a coated optical fiber 1b, a pair of coated optical fibers t2 including a coated optical fiber 1b and a coated optical fiber 1c, . . . , and a pair of coated optical fibers t7 including a coated optical fiber 1g and a coated optical fiber 1h illustrated in FIG. 3).

According to the configuration illustrated in FIG. 3, opposite sides (outer sides) of each of the pairs of coated optical fibers t1 to t7 corresponding to the portions where the intermittent connection portions 3 are formed, in the ribbon width direction are not connected in the ribbon width direction as illustrated in FIGS. 3 to 5, each pair of coated optical fibers t1 to t7 including two (2) adjacent fibers on which the intermittent connection portions 31 and 32 are formed (for example, the intermittent connection portions 31 connecting two coated optical fibers 1c and 1d to each other are formed on the pair of coated optical fibers t3 including the coated optical fiber 1c and the coated optical fiber 1d illustrated in FIG. 3 or 4, and opposite sides (outer sides) of the coated optical fibers 1c and 1d corresponding to the portions where the intermittent connection portions 3 are formed, in the ribbon width direction, respectively, are not connected).

According to the configuration in which the intermittent bonding type optical fiber ribbon 2 includes eight fibers illustrated in FIG. 3, a length L1 of each of the intermittent connection portions 31 and 32 in the intermittent bonding type optical fiber ribbon 2 is preferably about 5 to 35 mm, but the length L1 is not particularly limited to this range. In addition, a length L2 (a length of a portion between the intermittent connection portion 31 and the intermittent connection portion 32 adjacent to the intermittent connection portion 31 in the length direction as illustrated in FIG. 3) of each of the non-connection portions 4 formed at the same position when viewed from the ribbon width direction is preferably about 5 to 15 mm, but the length L2 is not particularly limited to this range. A length L3 (a length of a portion between two intermittent connection portions 31 in the length direction) of each of the non-connection portions 4 of one pair of coated optical fibers (for example, the pair of coated optical fibers t1) is preferably about 15 to 65 mm, but the length L3 is not particularly limited to this range.

In addition, a pitch P in the intermittent bonding type optical fiber ribbon 2 (the pitch P indicates a length from an intermittent connection portion 31 to an intermittent connection portion 31, the intermittent connection portions being adjacent to each other in the length direction (alternatively, a length from an intermittent connection portion 32 to an intermittent connection portion 32). In FIG. 3, the pitch P indicates a length from an intermittent connection portion 31 to an intermittent connection portion 31) is preferably equal to or less than 100 mm and is preferably about 20 to 90 mm, but the pitch P is not particularly limited to this range.

(II-a) Ribbon Forming Step:

According to the present embodiment, a ribbon forming step is a step of manufacturing an optical fiber ribbon 21 by collectively coating circumferences or the like of coated optical fibers 1 arranged in parallel to each other with a resin composition containing a laser light absorbing component (absorbing component) which absorbs a laser wavelength. By the ribbon forming process, portions 7 collectively coated with the resin composition containing the laser light absorbing component are present between adjacent coated optical fibers 1 (the portion 7 collectively coated with the resin composition containing the laser light absorbing component between the adjacent coated optical fibers 1 is also referred to as a "portion 7 containing the laser light absorbing component") and it is possible to form non-connection portions 4 and intermittent connection portions 3 (portions remaining without being cut in the portions 7 containing the laser light absorbing component between the adjacent coated optical fibers 1) by cutting portions corresponding to the non-connection portions 4 from the portions 7 through irradiation with a pulse laser light in the following process.

As the laser light absorbing component, for example, a pigment known in the art or the like can be used, and a cyanine compound, a phthalocyanine compound, a dithiol metal complex, a naphthoquinone compound, a diimmonium compound, an azo compound, a naphthalocyanine compound, a nickel dithiolene complex, a squarylium coloring matter, a quinine-based compound, quinacridone, dioxazine, benzimidazolone, carbon black, titanium oxide, a ferrite compound such as a nickel-iron ferrite, a manganese-zinc ferrite, a nickel-zinc ferrite, a copper-zinc ferrite, or the like, a phthalocyanine compound, nickel, iron particles, gold particles, copper particles, and the like can be used. These components may be used alone or a combination of two or more thereof may be used.

In the resin composition containing the laser light absorbing component, a resin including a matrix material does not absorb light having a wavelength in a visible light region or a near infrared region. Therefore, when the visible light region (about 380 nm to 780 nm) is used as the pulse laser light, it is preferable to use, for example, a phthalocyanine compound, quinacridone, dioxazine, benzimidazolone, titanium oxide, gold particles, copper particles, and the like. When the near infrared region (about 1000 nm to 2000 nm) is used, it is preferable to use, for example, a phthalocyanine compound, nickel, iron particles, a manganese-zinc ferrite, a nickel-zinc ferrite, a copper-zinc ferrite, titanium oxide, and the like.

A laser light absorbing component having an arbitrary form such as a spherical form, a powder form, a granular form, or the like in addition to a particle form can be used. In addition, it is preferable that an average particle diameter of the laser light absorbing component is within a range from about 0.01 to 2 μm. The average particle diameter may be measured by measuring primary particle diameters of the laser light absorbing component in an observation sample at a predetermined magnification (for example, hundred thousand times) by a transmission electron microscope and using an average value of the primary particle diameters. When the laser light absorbing component has a form other than the spherical form, a major axis and a minor axis are measured and a value obtained by (a sum of the major axis and the minor axis)/2 may be an average particle diameter.

The resin composition containing the laser light absorbing component is a main element of a material for coating or connecting the coated optical fibers 1 in the forming of the ribbon and is a matrix containing the laser light absorbing component, and a resin composition known in the art and an additive-mixed composition thereof can be used as the usable resin composition, similarly to the material for forming the primary coating layer 11 of the coated optical fiber 1 described above. For example, an ultraviolet-curing resin composition containing a resin such as an ultraviolet-curing resin or the like can be used. In detail, for example, it is possible to preferably use a resin composition containing a necessary component among various additives such as an oligomer, a diluent monomer, a photoinitiator, a silane coupling agent, a sensitizer, a pigment (and a coloring material in which a pigment and a resin or the like are mixed), a lubricant, and the like. It should be noted that when the resin composition is the ultraviolet-curing resin composition, it is easy to cure the resin composition through irradiation with ultraviolet rays in the ribbon forming process, which is preferable.

A content of the laser light absorbing component in the resin composition may be appropriately determined depending on a kind of another component in the resin composition, or the like, but is not particularly limited as long as the content of the laser light absorbing component is an amount which is effective for absorbing laser light to cut a processing target (a cured resin composition containing a component absorbing a laser wavelength, or the like). As a guide, it is preferable to adjust the content so that a rate of absorption of the laser wavelength by the cured resin composition is equal to or more than 10%.

The laser processing is performed in a manner in which a processing target absorbs laser light. In general, the higher the rate of absorption of the laser light by the target is, the higher the efficiency of the absorption of the laser light by the target is, such that efficiency of the processing is similarly high. Meanwhile, when the rate of absorption is small, the laser light which is not absorbed is reflected by a surface of the processing target or a thermal damage is caused in a processing region, which is not preferable. As the rate of absorption of the laser wavelength is equal to or more than 10%, it is possible to process portions corresponding to the non-connection portions 4 of the optical fiber ribbon even when linear velocity is increased. It is particularly preferable that the rate of absorption of the laser wavelength is equal to or more than 15%.

The rate of absorption of 10% or more may be obtained by, for example, irradiating the processing target with pulse laser light with a wavelength of 1550 nm or 1060 nm under a predetermined condition and selecting a content of the laser light absorbing component at which the rate of absorption becomes 10%. In order for the rate of absorption of the laser wavelength to be equal to or more than 10%, it is preferable that a content of the laser light absorbing component is 0.3 to 5.0 mass % based on the entire resin composition containing the laser light absorbing component. When the content is smaller than 0.3 mass %, it is difficult to obtain the rate of absorption of the laser wavelength of 10% or more and absorption of the pulse laser light is not properly performed in some cases. Meanwhile, it is considered that when the content exceeds 5.0 mass %, the absorption of the laser light remains flat and costs is increased due to a relatively expensive laser light absorbing component. In addition, unnecessary coloring occurs, which is not preferable. It is particularly preferable that the content of the laser light absorbing component is 1.0 to 5.0 mass % based on the entire resin composition.

As the rate of absorption of the laser wavelength of the resin composition containing the laser light absorbing component, for example, Table 1 shows rates of absorption in a case where an oligomer obtained by adding an aromatic isocyanate and hydroxyl ethyl acrylate to a polyol using polypropylene glycol is used as the oligomer, a molecular weight of the polyol (polypropylene glycol) of a middle block is appropriately changed, and a cured sheet (thickness: 40 μm) obtained by irradiating, with ultraviolet rays, the resin composition in which a resin using a bifunctional monomer or a polyfunctional monomer contains the laser light absorption component in contents shown in Table 1 under a predetermined condition, is irradiated with pulse laser light with a wavelength of 1550 nm and 1060 nm.

(Rate of Absorption)

TABLE 1

| No. | Absorbing Component | Content (Mass %) | Average Particle Diameter (μm) | 1550 nm Rate of Absorption | 1060 nm Rate of Absorption |
|---|---|---|---|---|---|
| 1 | Titanium Oxide | 0.3 | Less than 2.0 | 10.1 | 11.1 |
| 2 | Titanium Oxide | 0.5 | Less than 2.0 | 11.1 | 14.1 |
| 3 | Titanium Oxide | 1.0 | Less than 2.0 | 12.0 | 18.5 |
| 4 | Titanium Oxide | 3.0 | Less than 2.0 | 16.3 | 29.0 |
| 5 | Benzimidazolone, Titanium Oxide (Mixing Ratio 1:1) | 1.1 | Less than 2.0 | 10.5 | 10.8 |
| 6 | Phthalocyanine Compound, Titanium Oxide (Mixing Ratio 1:1) | 1.4 | Less than 2.0 | 10.3 | 10.3 |
| 7 | Dioxazine | 0.5 | Less than 2.0 | 11.1 | 13.2 |
| 8 | Nickel-Zinc Ferrite | 1.0 | 1.7 | 15.3 | 16.0 |
| 9 | Nickel-Zinc Ferrite | 5.0 | 1.7 | 29.8 | 37.0 |
| 10 | Quinacridone | 1.0 | Less than 2.0 | 9.0 | 9.1 |
| 11 | Magnesium Hydroxide | 5.0 | 1.0 | 8.0 | 8.1 |

FIG. 6 is a front view illustrating an aspect of the optical fiber ribbon 21 obtained by the ribbon forming step according to the first embodiment. The ribbon forming step of manufacturing an optical fiber ribbon 21 (which indicates an optical fiber ribbon before the intermittent connection portions 3 and the non-connection portions 4 are formed, the same applies to the following description) having a configuration illustrated in FIG. 6 may be performed in a manner in which the plurality of coated optical fibers 1 are gathered and arranged by using predetermined aligning means, and then a nipple and a die are passed between adjacent coated optical fibers 1 to form a portion formed of the resin composition (for example, an ultraviolet-curing resin composition or the like) containing the laser light absorbing component between the adjacent coated optical fibers 1, the corresponding resin composition is applied around the coated optical fiber 1 in such a state, and then the resin composition is cured by curing means such as irradiation with ultraviolet rays or the like.

Figure 15:
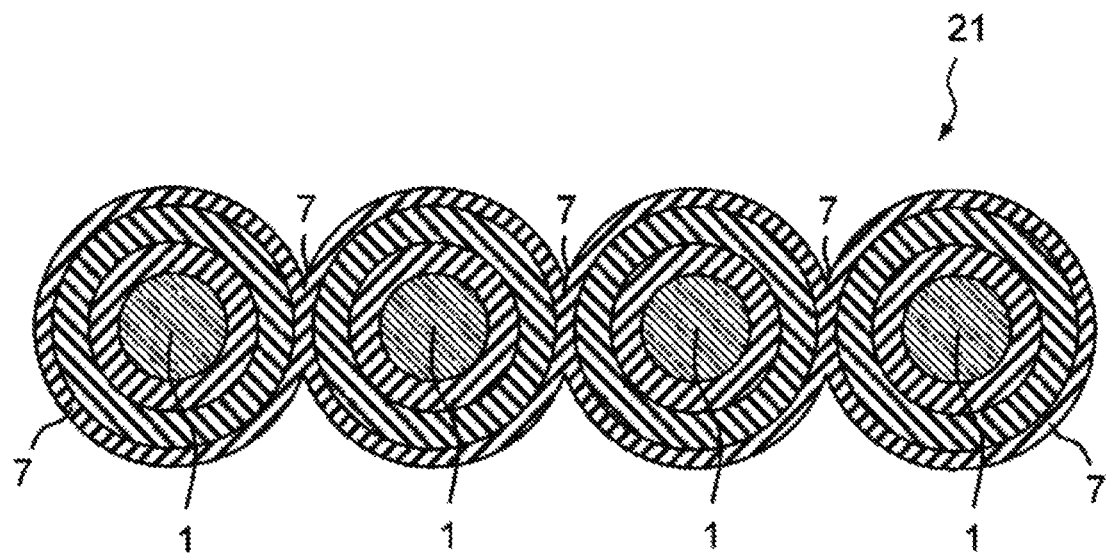
FIG. 15 is a view illustrating a cross-sectional structure of another aspect of the optical fiber ribbon.

The optical fiber ribbon 21 of which a surface has a flat shape in a cross-sectional view is manufactured by collectively coating the adjacent coated optical fibers 1 with the resin composition containing the laser light absorbing component. The resin composition may coat the adjacent coated optical fibers 1 so that the surface of the ribbon has a flat shape in a cross-section view as illustrated in FIG. 4 or the like. Alternatively, the resin composition may coat the adjacent coated optical fibers 1 so that a concave portion is formed between respective coated optical fibers 1 as illustrated in FIG. 15 or the like to be described later.

(II-b) Step of Forming Intermittent Connection Portions and Non-Connection Portions:

In a step of forming intermittent connection portions and non-connection portions (hereinafter, simply referred to as the "step of forming intermittent connection portions and the like" in some cases), the portion 7 which contains the laser light absorbing component and is present between the adjacent coated optical fiber 1 of the formed optical fiber ribbon 21 (the optical fiber ribbon in which the intermittent connection portions 3 and the non-connection portions 4 are not formed) as illustrated in FIG. 6 is irradiated with the pulse laser light, and the non-connection portions 4 at which the adjacent coated optical fibers 1 are not connected to each other in the length direction are intermittently formed. By doing so, portions remaining without being cut become the intermittent connection portions 3 intermittently connecting the adjacent coated optical fibers 1 to each other. As described above, the non-connection portions 4 and the intermittent connection portions 3 are conveniently formed between adjacent coated optical fibers 1 by the laser processing through the irradiation with the pulse laser light. Therefore, it is possible to rapidly form the intermittent connection portions 3 and the non-connection portions 4 while maintaining high linear velocity of the coated optical fiber 1 or a high speed of application of the resin composition applied to connect the adjacent coated optical fibers 1 to each other. As a result, it is possible to rapidly manufacture the intermittent bonding type optical fiber ribbon 2.

In the present process, the laser processing, in which the portions 7 containing the laser light absorbing component is irradiated with the pulse laser light and the portions 7 absorb the pulse laser light to be cut in a direction orthogonal to the length direction of the intermittent bonding type optical fiber ribbon 2, is performed. In the present invention, pulse laser light (which indicates, for example, laser light with a time width of about 0.1 to 100 nsec (nano seconds) and the same applies to the following description) is used as the laser light of the laser processing. Meanwhile, when $CO_2$ laser light is used instead of the pulse laser light, the $CO_2$ laser light is absorbed by the resin composition or glass of the optical fiber because a wavelength of the $CO_2$ laser light is generally 10.6 μm and is in a far infrared region (about 3 to 1000 μm). In addition, it is not preferable to use the $CO_2$ laser light, because a size of a beam spot of the laser light is 70 to 120 μm, which is large, and the optical fiber 10 itself is damaged in addition to the portion between the coated optical fibers 1. Meanwhile, when the pulse laser light is used as the laser light, a size of a beam spot (also corresponds to a cutting width) is about 8 to 15 μm, it is possible to decrease a processing width (cutting width), and it is also easy to adjust the size of the beam spot and the processing width.

It is preferable that pulse laser light with a wavelength of about 500 to 2000 nm is emitted so that the non-connection portions 4 are efficiently formed by cutting (laser processing) by absorption of the pulse laser light by the laser light absorbing component. In the laser processing in which the $CO_2$ laser light described above is used, a wavelength that is in the far infrared region and is longer than a range of the pulse laser light is used. In the present invention, for example, pulse laser light with a wavelength of 1550 nm or 1060 nm, or the like can be preferably used.

The processing width (cutting width) at the time of the irradiation with the pulse laser light also corresponds to a width of the non-connection portion 4 and is preferably about 8 to 15 μm. As the cutting width is within the range, it is possible to efficiently form the non-connection portions 4 and suppress a damage to the coated optical fiber 1 or the like. Requirements for the irradiation with the pulse laser light can be, for example, as follows, but are not limited thereto.

Pulse output: 1 to 100 W
Pulse width: 0.1 to 100 ns
Frequency (repetition frequency): 10 to 1000 kHz A pulse laser light irradiation device known in the art can be used for the irradiation with the pulse laser light. In the present invention, however, it is preferable to use a device including a fiber-type pulse laser. The fiber type pulse laser adopts a component such as a master oscillator power amplifier (MOPA) in which an output light pulse from a semiconductor laser is amplified by a fiber-type light amplifier (not illustrated). A seed light source is selected and controlled, such that it is possible to change output characteristics (a pulse width, a repetition frequency, and the like) of the laser in a wide range, and it is possible to realize a high output by connecting the fiber-type amplifier in multiple stages, which is advantageous.

As the fiber-type pulse laser, for example, a fiber-type pulse laser which is reported in "development of 1.5 μm range nanosecond pulse laser" in "fiber laser technologies of the 482th workshop of the laser society of Japan" or a (nanosecond) fiber-type pulse laser which is reported in "development of nano second pulsed laser using polarization maintaining fibers" in Furukawa Electric Review No. 131 may be used.

The fiber-type pulse laser or the like generates a light pulse obtained by directly modulating and driving a semiconductor laser with a wavelength of 1550 nm or 1060 nm by using a dedicated driving circuit, and the light pulse output from the semiconductor laser is amplified by a two-stage erbium-doped fiber amplifier. As a booster amplifier, an erbium-doped high order mode (HOM) fiber which utilizes propagation of a higher order mode to suppress an influence of a nonlinear phenomenon in a fiber is adopted.

Figure 7A:
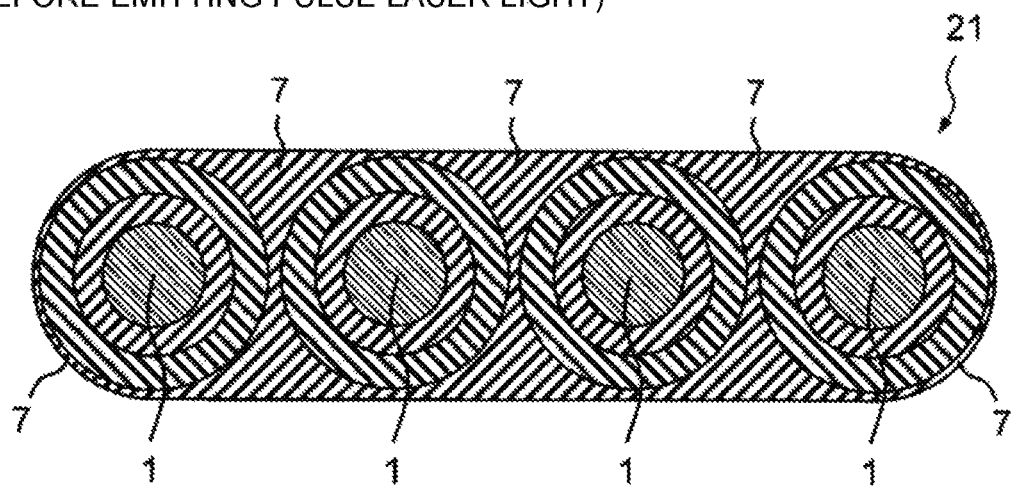
FIG. 7A and FIG. 7B are a view schematically illustrating implementation of a step of forming intermittent connection portions or the like according to the first embodiment.
Figure 7B:
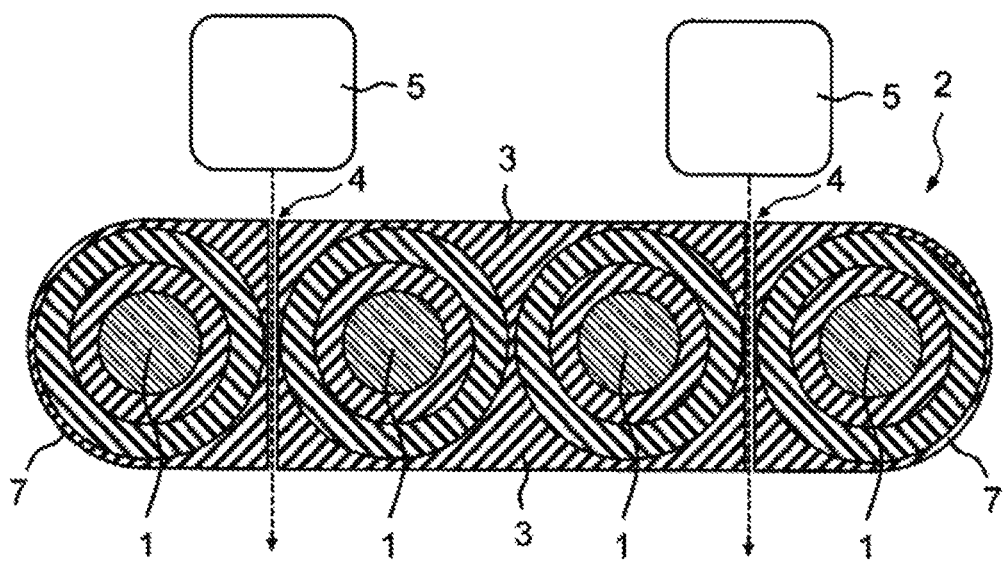

FIG. 7A and FIG. 7B are a view schematically illustrating implementation of the step of forming intermittent connection portions and the like according to the first embodiment (an upper side of the drawing shows a state "before irradiating with the pulse laser light" and a lower side of the drawing shows a state "after irradiating with the pulse laser light". The same applies to the following FIGS. 9 and 14). FIG. 7A and FIG. 7B illustrate an optical fiber ribbon 21 and an intermittent bonding type optical fiber ribbon 2 each of which includes four coated optical fibers 1 by way of example, for convenience, and illustrates non-connection portions 4 and intermittent connection portions 3 formed in a length direction when viewed from a predetermined cross-section, and a pulse laser light irradiation device 5 for formation of the non-connection portion 4 or the like (the same applies to FIGS. 9 and 14 to be described later).

The step of forming intermittent connection portions and the like may be implemented by moving, for example, the formed optical fiber ribbon 21 (in which the intermittent connection portions 3 and the non-connection portions 4 are not formed) in the length direction and irradiating, with the pulse laser light, portions at which the non-connection portions 4 are to be formed in portions which contain the laser light absorbing component and are present between adjacent coated optical fibers 1 by using the pulse laser light irradiation device 5 in a ribbon surface normal line of the optical fiber ribbon 21.

The optical fiber ribbon 21 is formed by being collectively coated with the resin composition containing the laser light absorbing component, and thus the laser processing is performed so that portions at which the non-connection portions 4 are to be formed in the portions 7 containing the laser light absorbing component between the adjacent coated optical fibers 1 while moving the optical fiber ribbon 21 is irradiated with the pulse laser light, and the portions at which the non-connection portions 4 are to be formed absorb the pulse laser light and are cut in a direction orthogonal to the length direction. As a result, the non-connection portions 4 at which the adjacent coated optical fibers 1 are not connected to each other in the length direction are formed as illustrated in FIG. 3, such that the intermittent bonding type optical fiber ribbon 2 is formed.

In addition, as the non-connection portions 4 are formed as described above, portions at which the non-connection portions 4 are not formed between the adjacent coated optical fibers 1 become the intermittent connection portions 3 intermittently connecting the adjacent coated optical fibers 1 in the length direction.

As illustrated in FIG. 6, the portions 7 (the portions 7 containing the laser light absorbing component) collectively coated with the resin composition containing the laser light absorbing component are continuously formed in the length direction (the same direction as the length direction of the coated optical fiber 1) of the optical fiber ribbon 21. Therefore, it is preferable that the irradiation with the pulse laser light for forming the non-connection portions 4 is intermittently performed with respect to the portions at which the non-connection portions 4 are to be formed while the optical fiber ribbon 21 is moving in the length direction. The same applies to irradiation with pulse laser light for forming non-connection portions 4, which will be described in modification of the embodiment to be described later.

(III) Advantageous Effect of the Invention

According to the method for manufacturing an intermittent bonding type optical fiber ribbon 2 according to the present invention described above, it is possible to conveniently form the non-connection portions 4 and the intermittent connection portions 3 between adjacent coated optical fibers 1 which form the ribbon by the laser processing in which the optical fiber ribbon 21 in which the coated optical fibers are not intermittently bonded is irradiated with the pulse laser light. Therefore, it is possible to provide a method for manufacturing an intermittent bonding type optical fiber ribbon 2, which is capable of rapidly forming the intermittent connection portions 3 and the non-connection portions 4 while maintaining high linear velocity of the coated optical fiber 1 or a high speed of application of the resin composition applied to connect the adjacent coated optical fibers 1 to each other.

Further, the non-connection portions 4 and the intermittent connection portions 3 are formed in the intermittent bonding type optical fiber ribbon 2 obtained by the manufacturing method described above through the irradiation with the pulse laser light, such that the intermittent bonding type optical fiber ribbon 2 becomes the intermittent bonding type optical fiber ribbon 2, which is capable of securing operability during collective connection and surely being subjected to an intermediate branching without damaging cable characteristics during high density mounting.

(IV) Configuration of Intermittent Bonding Type Optical Fiber Ribbon 2 and Manufacturing Thereof (Second Embodiment):

Next, a second embodiment of the present invention will be described. Similarly to the first embodiment, an intermittent bonding type optical fiber ribbon 2, which is manufactured according to the present embodiment, is also manufactured by arranging a plurality of coated optical fibers 1 in parallel to one another and forming intermittent connection portions 3 intermittently connecting adjacent coated optical fibers 1 to each other in a length direction and non-connection portions 4 at which adjacent coated optical fibers are intermittently not connected to each other in the length direction. In the first embodiment described above, an aspect in which a circumference or a portion between the coated optical fibers 1 arranged in parallel to each other is collectively coated with the resin composition containing the laser light absorbing component in the ribbon forming step has been used to describe formation of the portion containing the laser light absorbing component.

Meanwhile, the second embodiment is different from the first embodiment considering that the coated optical fibers 1 arranged in parallel to each other are formed into a ribbon by a resin composition (ribbon forming process), portions 7' collectively coated with a resin composition which does not contain a laser light absorbing component are formed, and then a laser light absorbing portion 6 (corresponding to the portions 7 which contain the laser light absorbing component and are present between adjacent coated optical fibers 1 in the first embodiment), in which a resin composition containing the laser light absorbing component is present, is formed between at least adjacent coated optical fibers 1.

According to the second embodiment, after the laser light absorbing portion 6 is formed, the laser light absorbing portion 6 is irradiated with pulse laser light to intermittently form the non-connection portions 4 at which adjacent coated optical fibers 1 are not connected to each other in the length direction, such that the intermittent connection portions 3 which are portions remaining without being cut are formed (a step of forming intermittent connection portions and the like).

It should be noted that the same reference numeral denotes the same structure as that of the first embodiment described above and the common members in the description of the present embodiment which has similar effects to those of the first embodiment described above and a modified aspect to be described later, and detailed description of the same structure as that of the first embodiment described above and the common members will be omitted or will be simplified. Further, the intermittent bonding type optical fiber ribbon 2 manufactured according to the present embodiment has an appearance which is common to that of the intermittent bonding type optical fiber ribbon 2 illustrated in FIGS. 3 to 5, but is different from the intermittent bonding type optical fiber ribbon 2 illustrated in FIGS. 3 to 5, considering that the portions 7 collectively coated with the resin composition containing the laser light absorbing component become the portions 7' collectively coated with the resin composition which does not contain the laser light absorbing component.

As for the ribbon forming process, a resin composition which is known in the art and is used for manufacturing the intermittent bonding type optical fiber ribbon 2 can be used as a material coating the coated optical fibers 1 arranged in parallel to each other. For example, it is possible to preferably use the resin constituting the resin composition containing the laser light absorbing component described in the first embodiment, or the like. In addition, similarly, it is possible to use the additive described in the first embodiment as an additive added to the resin composition. The "resin composition which does not contain the laser light absorbing component" indicates that the laser light absorbing component is not actively contained, but does not exclude a case where the absorbing component or a common or similar component is contained not for the purpose of absorbing the laser light, or the like.

In addition, it is possible to preferably use the laser light absorbing component and the resin composition described in the first embodiment described above for the laser light absorbing portion 6. In addition, similarly, it is possible to use the additive described in the first embodiment as the additive added to the resin composition.

The laser light absorbing portion 6 is formed by forming the resin composition containing the laser light absorbing component between at least adjacent coated optical fibers 1. The laser light absorbing portion 6 may be continuously formed in the length direction of the coated optical fiber 1 or may be formed at a portion corresponding to a portion at which the non-connection portion 4 is formed. For example, it is preferable that the laser light absorbing portions 6 are intermittently formed in the length direction of the coated optical fiber 1. As the laser light absorbing portions 6 are intermittently formed in the length direction, it is possible to realize a cost reduction, for example, it is possible to suppress the use of the resin composition containing the laser light absorbing component to a minimum.

FIG. 8 is a front view of an optical fiber ribbon 21 obtained by a step of forming laser light absorbing portions according to the second embodiment. It should be noted that FIG. 8 illustrates a configuration in which the laser light absorbing portions 6 are intermittently formed in the length direction of the coated optical fiber 1 (optical fiber ribbon 21).

The manufacturing of the intermittent bonding type optical fiber ribbon 2 according to the present embodiment is performed in the following manner. First, the coated optical fibers 1 are formed into a ribbon by using the resin composition which does not contain the laser light absorbing component by the same method as the first embodiment described above, and the portions 7' collectively coated with the resin composition which does not contain the laser light absorbing component are formed. Next, the resin composition such as an ultraviolet curing resin composition containing the laser light absorbing component is applied or the like to a desired portion including a portion at which the non-connection portion 4 is to be formed by using an application roll or the like, and the resin composition which is applied or the like is cured through irradiation with ultraviolet rays as necessary. By doing so, the optical fiber ribbon 21 in which the laser light absorbing portion 6 is formed and of which the front view is illustrated in FIG. 8 is formed.

It is preferable that the laser light absorbing portion 6 is formed by applying the resin composition containing the laser light absorbing component as described above. As the laser light absorbing portion 6 is formed by application, workability is improved and it is possible to form the laser light absorbing portion 6 significantly efficiently.

Figure 9A:
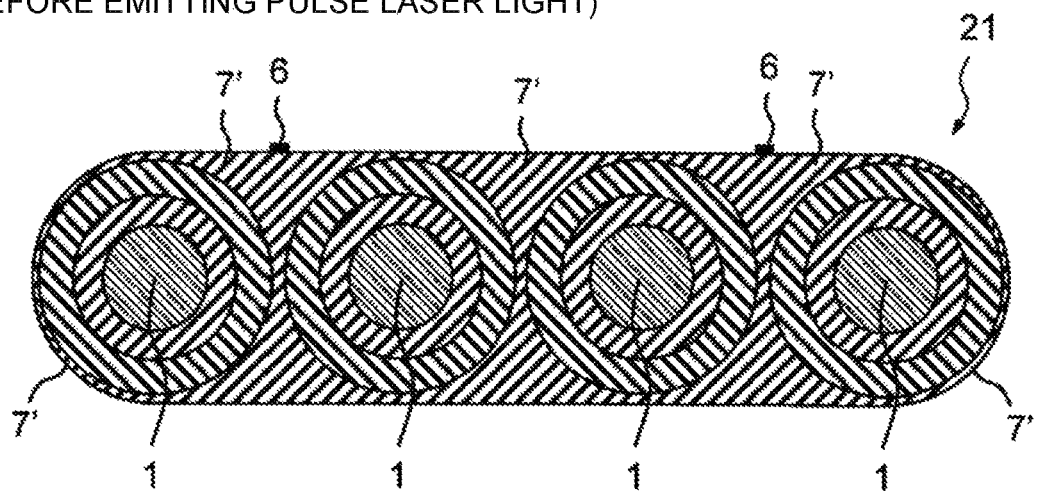
FIG. 9A and FIG. 9B are a view schematically illustrating implementation of a step of forming intermittent connection portions or the like according to the second embodiment.
Figure 9B:
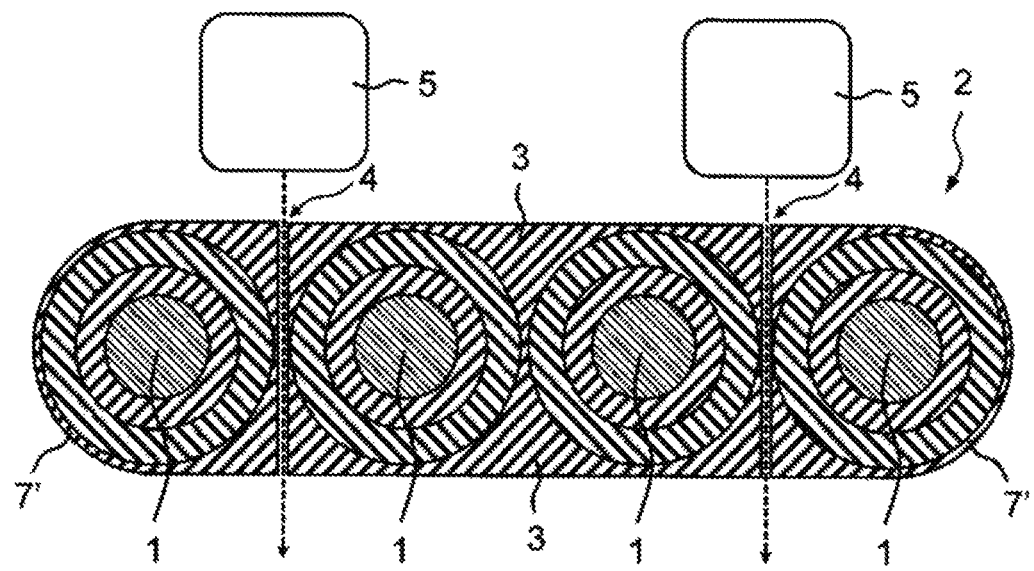

FIG. 9A and FIG. 9B are a view schematically illustrating implementation of the step of forming intermittent connection portions and the like according to the second embodiment. The step of forming intermittent connection portions and the like may be implemented by moving, for example, the optical fiber ribbon 21 in which the portions 7' collectively coated with the resin composition which does not contain the laser light absorbing component, and the laser light absorbing portions 6 are formed as illustrated in FIG. 9A and FIG. 9B in the length direction, and irradiating, with the pulse laser light, the laser light absorbing portion 6 (corresponding to a portion at which the non-connection portion 4 is to be formed) between adjacent coated optical fibers 1 by using the pulse laser light irradiation device 5 in a ribbon surface normal line direction of the optical fiber ribbon 21.

The laser processing is performed so that the laser light absorbing portion 6 between the adjacent coated optical fibers 1 is irradiated with the pulse laser light, and the laser light absorbing portion 6 is cut in a direction orthogonal to the length direction. As a result, the non-connection portions 4 at which the adjacent coated optical fibers 1 are not connected to each other in the length direction as illustrated in FIGS. 3 to 5. are formed (the non-connection portions 4 are formed as illustrated in FIGS. 3 to 5). In actual manufacturing, the laser light absorbing portion 6 remains on a surface of the intermittent bonding type optical fiber ribbon 2 in some cases. However, the remaining laser light absorbing portion 6 is not illustrated FIGS. 3 to 5, and on lower sides of FIG. 9A and FIG. 9B.

In addition, as the non-connection portions 4 are formed as described above, portions at which the non-connection portions 4 are not formed between the adjacent coated optical fibers 1 become the intermittent connection portions 3 intermittently connecting the adjacent coated optical fibers 1 in the length direction, which is the same as the first embodiment (the intermittent connection portions 3 are formed as illustrated in FIGS. 3 to 5).

Various conditions related to the irradiation with the pulse laser light performed in the step of forming intermittent connection portions and the like are the same as those described in (II-b) of the first embodiment, and thus description thereof will be omitted.

In addition, the laser light absorbing portions 6 are intermittently formed in the length direction of the coated optical fiber ribbon 21 as illustrated in FIG. 8. However, other portions of the optical fiber ribbon 21 do not have the laser light absorbing component and thus do not absorb the pulse laser light. Accordingly, it is possible to manufacture the intermittent bonding type optical fiber ribbon 2 even by emitting the pulse laser light continuously in the length direction.

(V) Modification of Embodiment (Modified Aspect):

The aspect described above is merely one of the aspects of the present invention. The present invention is not limited to the embodiments described above and it goes without saying that a modification or an improvement which includes the configuration of the present invention and is within a range where the object and the effects can be achieved is included in the content of the present invention. Further, as the specific structures, shapes, and the like at the time of implementing the present invention, other structures, shapes, and the like may be used within the range where the object and effect of the present invention can be achieved. The present invention is not limited to the respective embodiments described above, and a modification or an improvement within the range where the object of the present invention can be achieved is included in the present invention.

For example, in the first embodiment described above, the aspect in which a circumference or a portion between the coated optical fibers 1 arranged in parallel to each other is collectively coated with the resin composition containing the laser light absorbing component in the ribbon forming step has been used to describe formation of the portion 7 containing the laser light absorbing component.

Meanwhile, as for the manufacturing method according to the first embodiment, in the ribbon forming process, it is not necessary to collectively coat a circumference or the like of the coated optical fibers 1 arranged in parallel to each other with the resin composition containing the laser light absorbing component. For example, the following modified aspect in which the ribbon is formed by forming a portion 7a connected by the resin composition containing the laser light absorbing component between adjacent coated optical fibers 1 is also included in the manufacturing method according to the first embodiment.

FIG. 10 is a front view of an intermittent bonding type optical fiber ribbon 2 manufactured by a manufacturing method according to a modified aspect of the first embodiment. In addition, FIG. 11 is a cross-sectional view taken along line A-A in FIG. 10, and FIG. 12 is a cross-sectional view taken along line B-B in FIG. 10.

Figure 11:
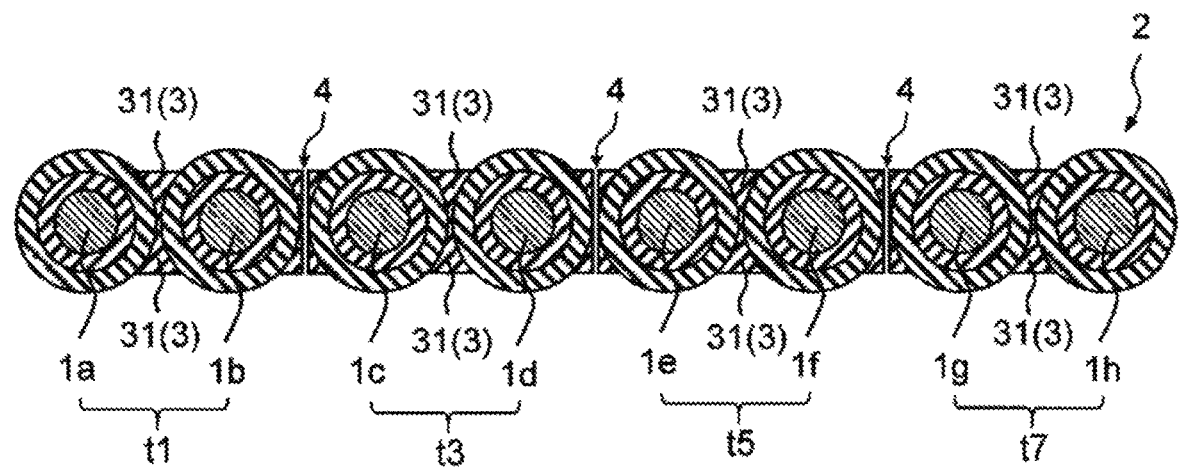
FIG. 11 is a cross-sectional view taken along line A-A in FIG. 10.
Figure 12:
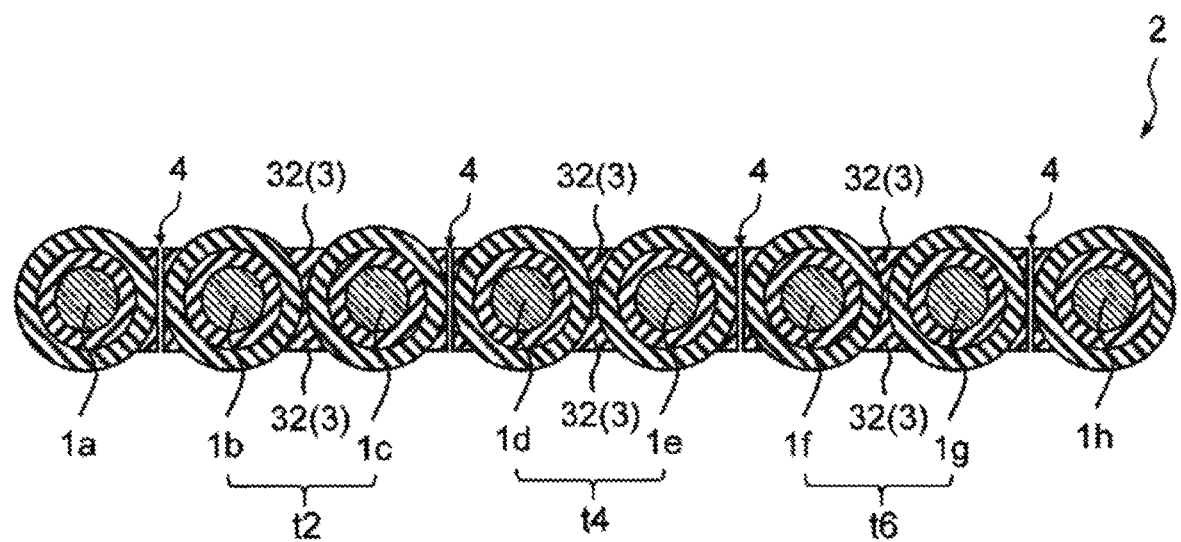
FIG. 12 is a cross-sectional view taken along line B-B in FIG. 10.

In the intermittent bonding type optical fiber ribbon 2 illustrated in FIGS. 10 to 12, the portion 7a (a portion containing the laser light absorbing component) (for the connected portion 7a, see upper sides of FIGS. 13 and 14 to be described later) connected by the resin composition containing the laser light absorbing component is interposed between adjacent coated optical fibers 1 in the coated optical fibers 1 arranged in parallel to each other, and intermittent connection portions 3 connecting the adjacent coated optical fibers 1 and non-connection portions 4 which are intermittently cut in the length direction by irradiation with the pulse laser light are formed by the connected portion 7a.

Figure 13:
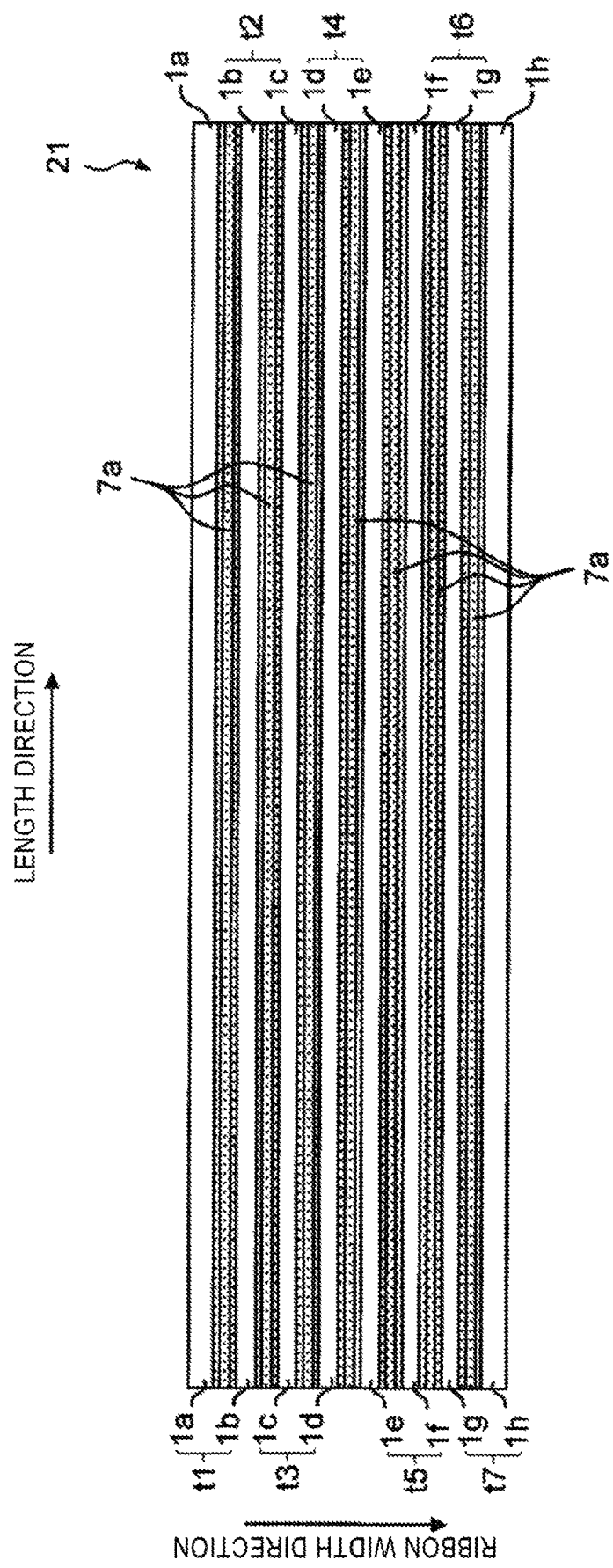
FIG. 13 is a front view illustrating an aspect of an optical fiber ribbon obtained by a ribbon forming step according to the modified aspect of the first embodiment.

In addition, FIG. 13 is a front view illustrating an aspect of an optical fiber ribbon 21 obtained by a ribbon forming step according to a modified aspect of the first embodiment.

In the ribbon forming step according to the present modified aspect, it is possible to obtain the optical fiber ribbon 21 having a configuration illustrated in FIG. 13 by applying the resin composition such as an ultraviolet curing resin composition containing the laser light absorbing component between adjacent coated optical fibers 1 in the coated optical fibers 1 arranged in parallel to each other and then curing the resin composition under a predetermined condition.

For example, it is possible to obtain the optical fiber ribbon 21 in which the portion 7a connected by the resin composition containing the laser light absorbing component is formed between adjacent coated optical fibers 1 in a plurality of coated optical fibers 1 arranged in parallel to each other by bringing the plurality of coated optical fibers 1 into contact with application rolls, respectively, applying the resin composition such as an ultraviolet curing resin composition containing the laser light absorbing component on side surfaces of each coated optical fiber 1, aligning the coated optical fibers 1 so that the side surfaces of the coated optical fibers 1 coated with the resin composition come into contact with each other by using aligning means, and curing the resin composition through irradiation with ultraviolet rays or the like.

Figure 14A:
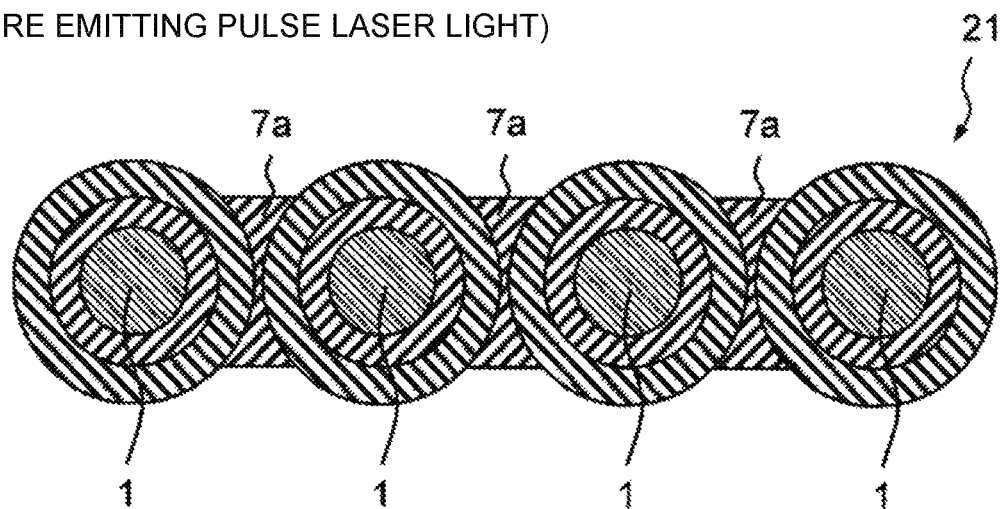
FIG. 14A and FIG. 14B are a view schematically illustrating implementation of a step of forming intermittent connection portions or the like according to the modified aspect of the first embodiment.
Figure 14B:
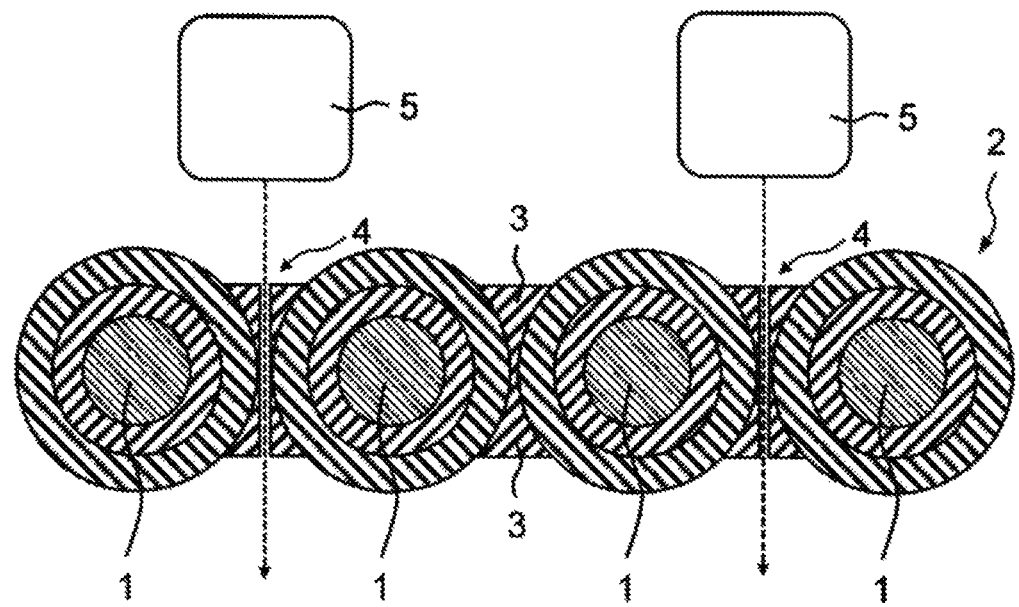

FIG. 14A and FIG. 14B are a view schematically illustrating implementation of a step of forming intermittent connection portions or the like according to the modified aspect of the first embodiment. The step of forming intermittent connection portions and the like according to the present modified aspect may be implemented by, similarly to the first embodiment, moving the formed optical fiber ribbon 21 having the configuration in FIG. 13 in the length direction and irradiating, with the pulse laser light, a portion at which the non-connection portion 4 is to be formed in the portion 7a connected by the resin composition containing the laser light absorbing component by using the pulse laser light irradiation device 5 in a ribbon surface normal line of the optical fiber ribbon 21.

The laser processing is performed so that the portion at which the non-connection portion 4 is to be formed in the connected portion 7a between the adjacent coated optical fibers 1 is irradiated with the pulse laser light, and the portion at which the non-connection portion 4 is to be formed is cut in a direction orthogonal to the length direction, thereby forming the non-connection portion 4 which is a portion at which the adjacent coated optical fibers 1 are not connected to each other in the length direction.

In addition, as the non-connection portions 4 are formed as described above, portions at which the non-connection portions 4 are not formed in the portion 7a connected by the resin composition containing the laser light absorbing component become the intermittent connection portions 3 intermittently connecting the adjacent coated optical fibers 1 in the length direction.

In the embodiment described above, the colored and coated optical fiber 1 having the configuration as illustrated in FIG. 2 has been described as an example of the coated optical fiber 1 constituting the intermittent bonding type optical fiber ribbon 2 with reference to FIG. 4 or the like. However, the colored and coated optical fiber 1 having the configuration in which the colored layer 13 is formed as illustrated in FIG. 1 may also be used as the coated optical fiber 1.

In the embodiment described above, the aspect, in which the optical fiber ribbon 21 or the intermittent bonding type optical fiber ribbon 2 is coated with the resin composition so that a surface of the ribbon has a flat shape in a cross-sectional view as illustrated in FIG. 4 or the like, and the portions 7 collectively coated with the resin composition containing the laser light absorbing component, or the like are formed, has been described. Meanwhile, the structure of the optical fiber ribbon 21 or the like is not limited to the structure illustrated in FIG. 4 or the like. For example, the optical fiber ribbon 21 may also be coated with the resin composition so that a concave portion is formed between adjacent coated optical fibers 1.

Figure 16:
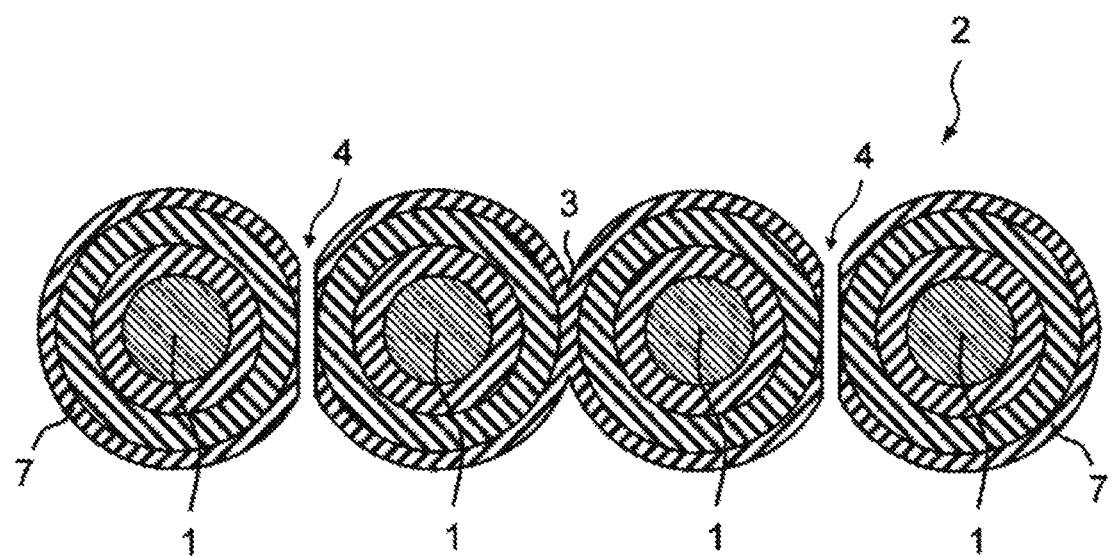
FIG. 16 is a view illustrating a cross-sectional structure of another aspect of the optical fiber ribbon.

FIG. 15 is a view illustrating a cross-sectional structure of another aspect of the optical fiber ribbon 21, and FIG. 16 is a view illustrating a cross-sectional structure of another aspect of the intermittent bonding type optical fiber ribbon 2. In FIGS. 15 and 16, a case of four coated optical fibers 1 is described for convenience.

As for an optical fiber ribbon 21 illustrated in FIG. 15, a laser processing length (depth) is shorter in comparison to the optical fiber ribbon 21 illustrated in FIG. 4 or the like, such that the processing becomes more convenient and it is possible to efficiently manufacture an intermittent bonding type optical fiber ribbon 2 illustrated in FIG. 16. In addition, the amount of resin composition used for coating can be decreased, which results in a cost reduction. The intermittent bonding type optical fiber ribbon 2 illustrated in FIG. 16 may also be manufactured by using the manufacturing method described in the second embodiment in which, as to the optical fiber ribbon 21 illustrated in FIG. 15, the portions 7' collectively coated with the resin composition which does not contain the laser light absorbing component are formed instead of the portions 7 collectively coated with the resin composition containing the laser light absorbing component, and the laser light absorbing portion 6 (not shown) is formed between adjacent coated optical fibers 1.

Besides, as the specific structure, shapes, and the like at the time of implementing the present invention, other structures and the like may be used within a range where the object of the present invention can be achieved.

INDUSTRIAL APPLICABILITY

The present invention can be effectively used as means for providing an optical fiber ribbon of which cable characteristics during high density mounting are not damaged, and thus industrial applicability of the present invention is high.

REFERENCE SIGNS LIST

1 Coated optical fiber (colored and coated optical fiber)
1a to 1h Coated optical fiber (colored and coated optical fiber)
10 Optical fiber (glass optical fiber)
11 Primary coating layer (primary layer)
21 Secondary coating layer (secondary layer)
12a Colored secondary coating layer
13 Colored layer
2 Intermittent bonding type optical fiber ribbon
21 Optical fiber ribbon
3 Intermittent connection portion
31, 32 Intermittent connection portion
4 Non-connection portion (Single fiber portion)
5 Pulse laser light irradiation device
6 Laser light absorbing portion
7 Portion collectively coated with resin composition containing laser light absorbing component (portion containing laser light absorbing component)
7' Portion collectively coated with resin composition which does not contain laser light absorbing component
7a Portion connected by resin composition containing laser light absorbing component
t1 to t7 pair of coated optical fibers

The invention claimed is:

1. A method for manufacturing an intermittent bonding type optical fiber ribbon in which a plurality of coated optical fibers are arranged in parallel to each other and intermittent connection portions intermittently connecting adjacent coated optical fibers to each other in a length direction are formed, the method comprising:
a step of forming the coated optical fibers into a ribbon by using a resin composition that does not contain a component which absorbs a pulse laser light;
a step of intermittently forming laser light absorbing portions that absorb the pulse laser light by applying a resin composition containing 0.3 to 5.0 mass % of a component which absorbs the pulse laser light, between the adjacent coated optical fibers; and
a step of forming the intermittent connection portions by irradiating, with the pulse laser light, the laser light absorbing portions to cut the portions, thereby leaving the intermittent connection portions.

2. The method for manufacturing an intermittent bonding type optical fiber ribbon according to claim 1, wherein laser light absorbing portions are intermittently formed in the length direction of the coated optical fiber.

3. The method for manufacturing an intermittent bonding type optical fiber ribbon according to claim 2, wherein the laser light absorbing portion is formed by applying the resin composition containing the laser light absorbing component which absorbs the laser wavelength.

4. The method for manufacturing an intermittent bonding type optical fiber ribbon according to claim 1, wherein the laser light absorbing portion is formed by applying the resin composition containing the laser light absorbing component which absorbs the laser wavelength.

5. The method for manufacturing an intermittent bonding type optical fiber ribbon according to claim 1, wherein a wavelength of the pulse laser light is 500 to 2000 nm.

6. An intermittent bonding type optical fiber ribbon manufactured by the method for manufacturing an intermittent bonding type optical fiber ribbon according to claim 1.

7. A method for manufacturing an intermittent bonding type optical fiber ribbon in which a plurality of coated optical fibers are arranged in parallel to each other and intermittent connection portions intermittently connecting adjacent coated optical fibers to each other in a length direction are formed, the method comprising:
a step of forming the coated optical fibers into a ribbon by using a resin composition containing 0.3 to 5.0 mass % of a component that absorbs a pulse laser light; and
a step of forming the intermittent connection portions by intermittently irradiating, with the pulse laser light, portions between the adjacent coated optical fibers to cut the portions, thereby leaving the intermittent connection portions.

8. The method for manufacturing an intermittent bonding type optical fiber ribbon according to claim 7, wherein a wavelength of the pulse laser light is 500 to 2000 nm.

9. An intermittent bonding type optical fiber ribbon manufactured by the method for manufacturing an intermittent bonding type optical fiber ribbon according to claim 7, wherein the non-connection portions are intermittently formed by irradiation with the pulse laser light to cut the non-connection portions.

* * * * *